US006816880B1

(12) United States Patent
Strandberg et al.

(10) Patent No.: US 6,816,880 B1
(45) Date of Patent: Nov. 9, 2004

(54) BROWSER USER INTER FACE FOR CLIENT WORKSTATION

(75) Inventors: Malcom B. Strandberg, Cambridge, MA (US); Robert J. Stent, Westford, MA (US); Anthony Curreri, Londonderry, NH (US); W. James Gillis, Jr., Andover, MA (US); John Cambray, Pelham, NH (US); B. Scott Smith, Londonderry, NH (US)

(73) Assignee: Concerto Software, Inc., Westford, MA (US)

( * ) Notice: Subject to any disclaimer, the term of this patent is extended or adjusted under 35 U.S.C. 154(b) by 0 days.

(21) Appl. No.: 09/048,630

(22) Filed: Mar. 26, 1998

Related U.S. Application Data

(60) Provisional application No. 60/042,063, filed on Mar. 26, 1997.

(51) Int. Cl.[7] .............................................. G06F 15/16
(52) U.S. Cl. ........................ 709/202; 709/204; 709/217
(58) Field of Search ........................... 345/330; 348/15; 370/389, 401; 709/204, 202, 228, 217

(56) References Cited

U.S. PATENT DOCUMENTS

| | | | | |
|---|---|---|---|---|
| 5,550,906 A | * | 8/1996 | Chau et al. ............ | 379/201.05 |
| 5,838,682 A | * | 11/1998 | Dekelbaum et al. ........ | 370/401 |
| 5,907,324 A | * | 5/1999 | Larson et al. ................ | 345/330 |
| 6,020,915 A | * | 2/2000 | Bruno et al. .................. | 348/15 |
| 6,031,836 A | * | 2/2000 | Haserodt .................... | 370/389 |
| 6,385,646 B1 | * | 5/2002 | Brown et al. ............... | 709/217 |

\* cited by examiner

*Primary Examiner*—Paul H. Kang
(74) *Attorney, Agent, or Firm*—Bourque & Associates, P.A.

(57) ABSTRACT

A web browser based client workstation receives web browser based information and displays the web browser based information in a web page browser format. The web browser based information may include operation critical application information which is interactively displayed and utilized to perform an operation critical application from the client workstation. The operation critical application may include a telephony application. The web browser based client workstation may include a script wizard for allowing a user to generate non-proprietary, industry standard, active objects to handle one or more applications. The client workstation may also include at least one host connection active object to handle information exchange between the web browser based client workstation and a host computer/database. Persistent data to be utilized by the client workstation may be stored within the workstation for later reuse without access to a server computer. The client workstation may execute HTML code which may be generated on the client workstation for control of an application by the workstation. The client workstation may also include web browser based scripting information for providing one or more script pages which can be logically related and called one after the other based upon an answer or response to a predetermined message text on a previous script page. The client workstation may be coupled to a server computer which includes at least one proxy server. The proxy server facilitates access to data external to the server computer. Data from multiple sources can be requested through the proxy server and displayed generally simultaneously on one web page of the web browser based client workstation.

25 Claims, 11 Drawing Sheets

BROWSER USER INTER FACE FOR CLIENT WORKSTATION

RELATED APPLICATION

This application is related to and claims the benefit of Provisional U.S. Patent Application No. 60/042,063 file date Mar. 26, 1997 entitled Browser User Interface for Scripting, filed by the Assignee of the present invention, and incorporated herein by reference.

FIELD OF THE INVENTION

This invention relates to computer systems and more particularly, to a browser user interface for a client workstation in a client/server environment in which the client workstation utilizes a web browser type interface for mission critical applications and takes advantage of other web browser interface functions and features.

BACKGROUND OF THE INVENTION

In the past, user interfaces to various computer applications have utilized custom designed, application specific, graphical and non-graphical user interfaces. The problems with these custom design graphical or non-graphical user interfaces are that they are not industry standard, often have a significant training or learning time, and non-uniform product behavior.

Graphical or non-graphical user interfaces must include specific binary code for each computer or operating system type which will utilize the interface. Although such interface code may reside on either a personal computer (PC) or on a file server, this separate network protocol is necessary for distribution of the operating interface. In addition, each computer running the interface will generate its own separate temporary files.

Given the significant volume of software now running on most computers, an additional software package which has its own "look and feel" will require training of the users to become familiar with the software package.

Accordingly, it would be advantageous to provide an industry standard, uniformly looking, uniformly behaving and uniformly accepted user interface for a mission critical application such as a telephony or other application.

SUMMARY OF THE INVENTION

The present invention features a system including a web browser based operation critical client workstation. The system includes a server computer including at least one web server, for servicing a number of connected web browser based client workstations. At least one client workstation is connected to this server computer and responsive to the web server, receives web browser based information and displays web browser based information in a web page browser format. The web based information received by the client workstation includes operation critical application information which is interactively displayed and utilized to perform an operation critical application directly from the client workstation.

In one embodiment, the operation critical application can include a telephony application such as inbound telephone call servicing, outbound telephone call servicing or a combination of inbound and outbound telephone call servicing applications. The client workstation can include an agent workstation or an agent supervisor workstation. In addition, the operation critical application information may include audio and display animation information.

The invention also features a web browser based operation critical agent workstation for a telephony system which includes a server computer having at least a web server, for servicing a number of connected web browser based client workstations. Also included is at least one telephony system web browser based agent workstation which is coupled to the server computer and responsive to the web server. The at least one telephony system web browser based agent workstation receives web browser based information and displays the information in a web page browser format. The information received includes operation critical application information which is interactively displayed and utilized to perform an operation critical application such as a telephony application.

In this embodiment, the web browser based agent workstation may include a script wizard, for allowing a user to generate at least one non-proprietary, industry standard active telephony object to handle a telephony application, and a host communication wizard, for allowing the user to generate at least one host connection active object to handle information exchange between the telephony system web browser based agent workstation and a host computer.

In another embodiment, the present invention includes a web browser based operation critical client workstation wherein at least one client workstation is coupled to a web server of a server computer. In response to the web server, at least one client workstation receives web browser based information and displays the information on a web page browser format. The information received by the client workstation includes operation critical application information allowing a user at the client workstation to operate and control the operation critical application from the client workstation. In this embodiment, the client workstation may store persistent data to be used by the workstation within the workstation, for later reuse without accessing the server computer. In yet another embodiment of the present invention, the invention features a web browser based client workstation, coupled to a web server, for executing HTML code and for displaying information in a web page browser format. The client workstation further includes a HTML code generator, for generating on the client workstation, web browser based HTML code for display and operation on the client workstation. In this embodiment, the HTML code generator may further include a script wizard, for allowing a user to generate at least one non-proprietary, industry standard active object to control an application. This embodiment may further include a host communication wizard, for allowing a user to generate at least one host connection, active object, to handle information exchange between the web browser based client workstation and a host computer.

Another embodiment of the present invention features a telephony system including a web browser based operation critical agent workstation and web browser based scripting. The system includes a server computer having at least a web server, for servicing a number of connected web browser based agent workstations. At least one agent workstation is coupled to the server computer and responsive to the web server for receiving web browser based information and for displaying the information in a web page browser format. The information received by the telephony system web browser based agent workstation includes operation critical telephony application information which is interactively displayed and utilized to perform a telephony operation critical application.

In this embodiment, the web browser based information received by the agent workstation includes web browser based scripting information, for providing at least one script page to be displayed on the agent workstation, for providing information to be communicated to a telephony system customer, and for allowing an agent at the agent workstation to input information regarding the telephony system customer in at least one location in the script page displayed. A further feature of this embodiment may include a number of script pages at least two of which can be displayed in a logical branch structure. In this embodiment, at least a first one of the script pages includes a predetermined message text comprising at least one question having at least two possible responses. The agent workstation causes a branch to at least a second script page based on an agent's indication of a response to the question in the predetermined message text of the first script page.

In yet another embodiment, the present invention features a telephony system including a web browser based operation critical agent workstation coupled to a computer server including at least a web server. The telephony system web browser based agent workstation receives web browser based information and displays the information in a web page browser format on the workstation. The web page information received by the agent workstation includes operation critical application information which is interactively displayed and utilized to perform a telephony operation critical application.

This embodiment also includes an agent workstation with a script wizard, for allowing a user to generate at least one non-proprietary, industry standard, telephony active object, as well as a host communication wizard, for allowing the user to generate at least one host connection active object for handling information exchange between the telephony system web browser based agent workstation and a host computer. Further, in this embodiment, the operation critical application information includes display of web browser based information for allowing the agent workstation to control both voice and data relative to at least one telephony call.

The present invention features, in another embodiment, a web browser based operation critical client workstation, coupled to a server computer, for receiving and displaying information received from the server computer in a web page browser format. The information received by the web browser based operation critical client workstation includes operation critical application information. In this embodiment, the server computer includes at least one proxy server, coupled to a source of information external to the server computer, for facilitating access to the data external to the server computer by the client workstation.

In this embodiment, the client workstation includes at least one web browser based web page for communicating with the proxy server on the server computer, for requesting information from the proxy server which is external to the server computer, and for receiving external information from the data source external from the server computer through the proxy server. A further feature of this embodiment allows the web browser based client workstation to access data from multiple sources generally simultaneously, and to display on one web page of the web browser based client workstation the data from multiple sources generally simultaneously.

The present invention additionally includes a system including a web browser based operation critical client workstation wherein the client workstation includes at least one client side active object. The at least one client side active object can initiate and control the operation of at least one function without intervention of a server computer or a web server.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
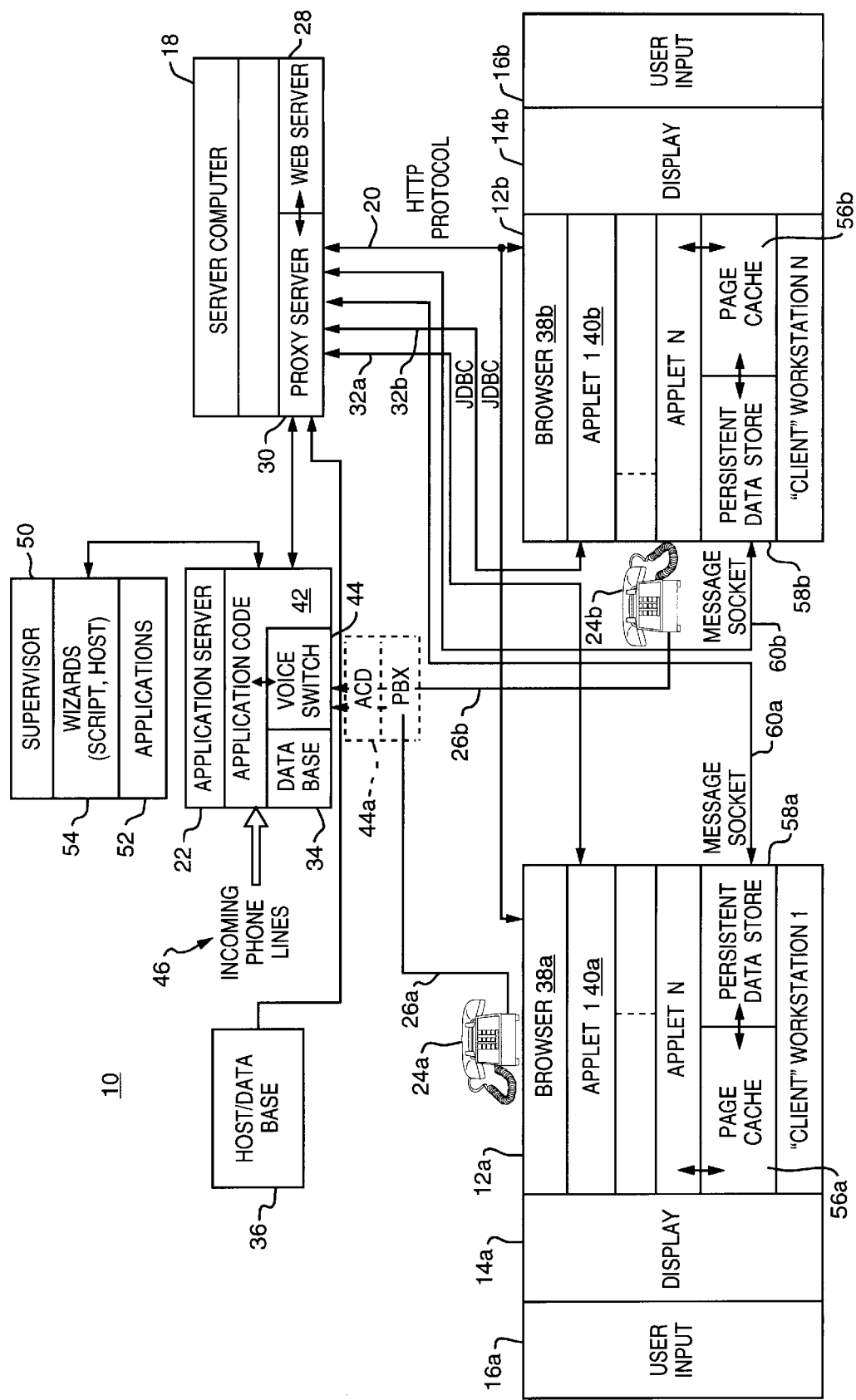
FIG. 1 is a block diagram of a system including a web browser based client workstation in accordance with the many embodiments of the present invention.

The present invention features a system 10, FIG. 1, including one or more web browser based client workstations 12. In the preferred embodiment, client workstations 12 include a personal computer having a display 14 and a user input mechanism 16 such as a keyboard, keypad and/or mouse 16. The personal computer (PC) of the client workstation 12 is typically run by an operating system such as Windows based program (Windows 95, Windows 97, Windows NT, etc.) or other operating system such as Unix.

The client workstations 12 are coupled to a server computer 18 by means of an internet type interconnection 20 utilizing a HTTP protocol. In the preferred embodiment, interconnection 20 is an intranet connection and the client workstations 12 are reasonably local to (usually within the same room or building) as server computer 18. This is not, however, a limitation of the present invention as an internet connection 20 may also be utilized thus facilitating the client workstations 12 to be remote from the server computer 18 and the application computer 22, which will be described in greater detail below.

In the case where the system 10 of the present invention is utilized to implement a telephony call center as in a disclosed exemplary implementation, the client workstations 12 are generally local to the application server 22 and the server computer 18 given that the agents or other users of the client workstations 12 also require a voice data set 24 such as a telephone for telephone call processing. In the case wherein the client workstations 12 are remote from the application server 22 and/or server computer 18, the client workstations may be coupled to the server computer 18 by means of a first telephone line 20 or by such other means as cable modem and cable line or other similar technology which exists now or may exist in the future. In this embodiment, a separate telephone line 26 provides voice communication to each of the voice data sets 24 at each of the client workstations 12.

In the exemplary embodiment, server computer 18 is typically a separate of stand alone personal computer (PC) which typically services between 10 and 100 client workstations 12. Given the significant processing carried on in the server computer 18, better performance is realized in the system 10 by having a server computer 18 as a separate processor. This is not a tremendous financial burden given the low prices of personal computers at the present time.

However, the present invention contemplates a server computer 18 implemented on or as part of an application server 22, without departing from the scope of the present invention.

Server computer 18 includes a web server 28, as is well known in the art, which provides internet type service using web browser style information written in HTML code as is well known in the art. Server computer 18 also includes proxy server 30 which may interface with web server 28 and provides access by the client workstation 12 to data outside of the server computer 18. One limitation of internet type communication utilizing the HTTP protocol is level of security inherent in such present protocol. This level of security only allows a client workstation to communicate with one server computer 18. Accordingly, a client workstation (agent workstation or Web Station in the case of the present exemplary telephony system) 12 coupled to a server computer 18 having a particular IP address may only communicate with that web server 28 and may not communicate with and obtain data from outside or external sources.
{ORIGINALLY PAGES 110–116 OF SPECIFICATION}

Overview of the Agent Web Station BUI

Figure 2:
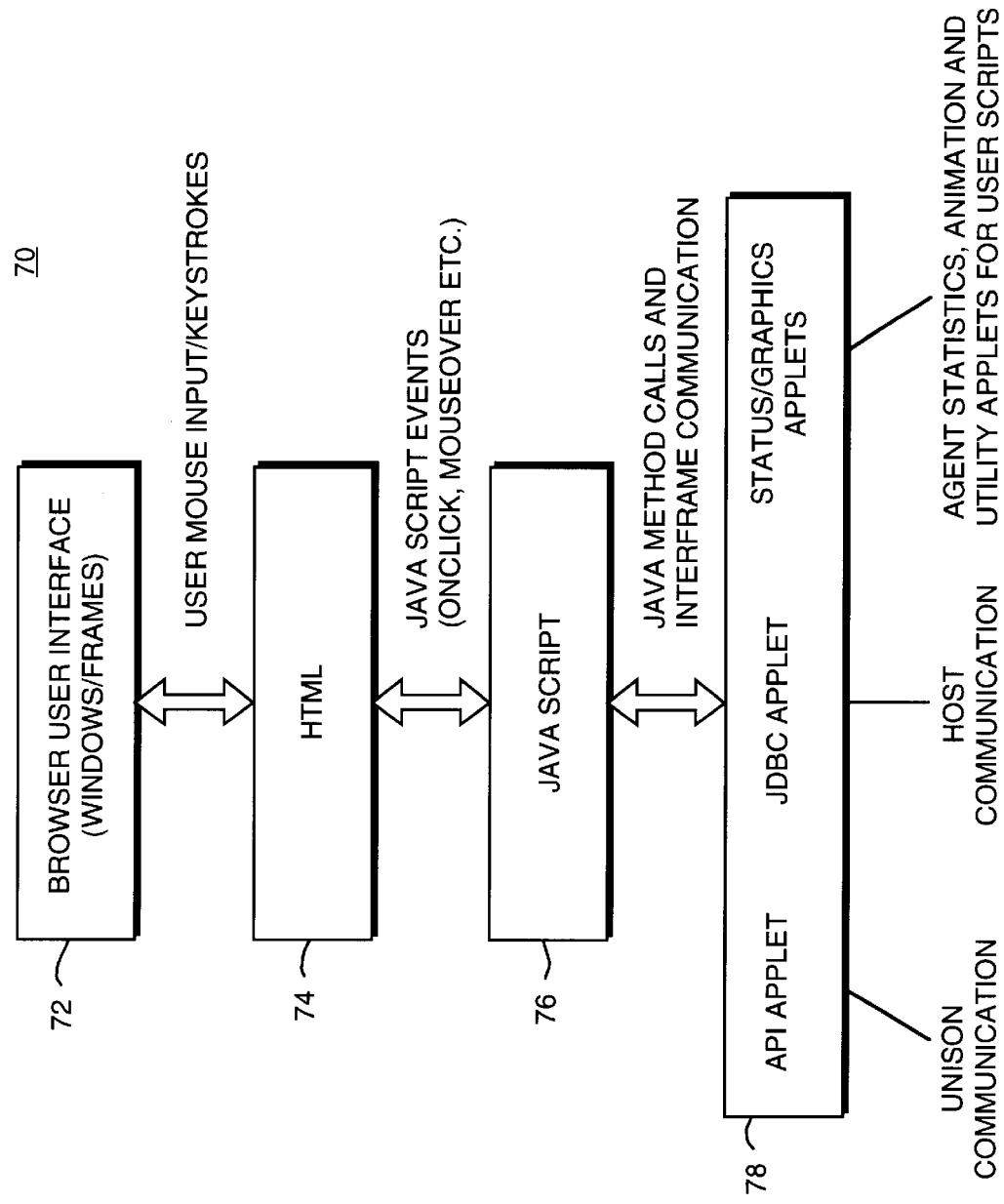
FIG. 2 is a schematic block diagram illustrating the various layers of the user webstation with browser user interface according to the present invention.

The Agent Web Station (AWS) 70, FIG. 2, according to the present invention, is an HTML/JAVA based workstation implemented as a series of software programs invoked from a Web Browser 38. Multiple browser windows and frames provide the context within which an entire user interface (BUI or browser user interface) is developed for agents to utilize all the functionality of the Unison System. The AWS 70 is a mutli-layered implementation designed to best use the available technologies.

The uppermost component is the browser based user interface 72 which is written in HTML and Java Script. This approach lends itself to an image/object style appearance rather than a typical button/text appearance of the prior art common GUI. The HTML layer 74 performs the following functions:

Window Creation, Display and Sizing;
Frame Organization;
Image Display;
Anchor's for Point/Click Operations; and
User Script Presentation (Screen Frame).

The Java Script layer 76 comprises a layer below the HTML layer 74 and bridges the point and click actions from the user to the API applet and other operational applets which may reside in the applet layer 78 within the BUI. In effect, it translates the agent activities into real time communications with the application 52 running on application server 22 or other hosts for session control and data retrieval/ update. Some examples of this would be Logon/Logoff, Campaign Selection, Population of Screen Information from Data Record Fields, and Call Transfer.

Additionally, when user scripts are displayed, Java Script allows HTML to be built dynamically with data from the current call record and/or host databases. The API Applet is the Java equivalent of the present Unison system Client API (CLAPI) with many additional benefits such as Platform Independence, Compatibility with TRS Message Library, Session State Machine and an overall higher level of interface which allows for a very thin BUI level.
{Note: FIG. 1 has become FIG. 2 of the dsrawings.}

Window/Frame Architecture

Since AWS is run from a browser, there are some operational considerations which must be accounted for when designing an application which is not intended for simply browsing information. For example, a browser allows the user to move backwards and forwards through pages or select different URL's. This is allowable when working a script, but since applets and Java Script are also running on the current pages an agent could inadvertently logoff the application with a misplaced mouse click. For this reason, the AWS BUI has been designed to minimize potential user pitfalls by utilizing multiple windows or URL's and frames which are under system control.

Main Window

A main page (aws.htm) is the initial URL specified by the agent from his browser which will be brought up as the current "web page". The purpose of this page is simply to provide an introductory screen and allow the agent to bring up the actual AWS in a separate browser window via point/click. The following template HTML/Java Script is used on this page and throughout the AWS BUI to translate image point/click's to specific Davox Unison system actions.

<SCRIPT>
function newWindow ( )
  {
  newWindow=window.open ("new.html",
    "windowName", "width=xxx, height=xxx, . . . parameter
    list")
  }
</SCRIPT>
<BODY>
<A href=dummyRef onClick="newWindow( );return false;">
<IMG src="images/start_aws.gif>

The parameter list supplied to 'open' allows for changing size as well as removing other browser functionality on the new window, such as location entry, toolbars etc.

AWS BUI Window

The BUI window(BUI.htm) consists of multiple frames within a single Browser window. Each frame, as the following sections describe, performs a different function relative to the overall AWS operation. It is important to note that the BUI window has no controls or toolbars, other than what is provided by Davox and is sized according to the AWS requirements. The four frames within this window are:

Administration Frame;
Termination Code Frame;
Status Frame; and
Screen Frame.

Administration Frame

The Administration Frame is the "heaviest" of the BUI Window's frames. It contains the API applet and 90 percent of the Java Script as well as supporting Applets and Script for inter-frame communication and JDBC host connectivity. Being non-scrollabe and non-resizable, this frame is comprised of a single HTML page (admin.htm) which does not change during the entire AWS session with the Unison® brand system (the exemplary application). Since the API Applet resides here, the connection to the application is shutdown as soon as this window is quit.

The Java Script within the admin.html performs multiple functions namely:

Message Communication to/from API Applet;

Handling of HTML Events;

Pop-up Window Creation; and

Frame to Frame Communication and Management.

Communication to the API Applet is done using Java Script functions which call various methods of the API. Since through Java Script, you have access to many of the Browser objects, invoking a method in an Applet is done by reference through the browser's object hierarchy. For example:

```
function admProcessLogon(uname,passwd)
{
    /* Call the API Applet's Login */
    document.APIApplet.admLogon(uname,passwd);
}
``` is the function which invokes the admLogon method within the API.

The Adminstration frame communicates with the API for two primary reasons, first, to issue application WSAPI (Work Station API) commands on behalf of the Agent (Logon, Break, Termcodes etc.) and second, to retrieve and set data fields (as the API also provides a persistent data store). However, the latter is utilized more in the screen frame during script processing for access to data record fields. Communication from Java Script through the API is asynchronous.

While the admin.html issues requests via function calls, responses and unsolicited requests from the API are retrieved by polling the API. When a specific message is available, the admin.html will invoke a Java Script call which has been formatted by the API using the 'eval' method. This has been done for compatibility with other browsers which do not have Java Script Object classes accessible to Java and cannot therefore provide a direct call to Java Script functions (ie. Microsoft Internet Explorer). For example:

```
function pollResponse( )
{
    str = document.APIApplet.admResponse( );
    if (str != null)
```

```
        eval(str);
}
Where str="admLogonResponse(0, 'Invalid Username')"
```

The above example would invoke a call to the Java Script function admLogonResponse which would process the response as if called from the API directly.

HTML Events are handled by Java Script with the built-in event handlers from within specific HTML tags. One of the more common handlers utilized in the AWS is 'onClick' which is triggered when a user clicks on an anchor or input field. The following HTML invokes the logon process when the user selects the 'Continue' button of the Logon Window.

```
<FORM name="lform">
Username<INPUT type=text maxsize=16 name="uname"><BR>
Password<INPUT type=text maxsize=16 name="uname"><BR>
<INPUT type=Button value="Continue"
onClick=
    "window.opener.admProcessLogon(lform.uname.value,lform.passwd.
value)">
</FORM>
```

Pop-up Utility Windows are created by the Administration Frame for particular functions requiring additional data such as Logon (Username and Password) and Campaign selections, and various Status alert conditions which do not appear in the Statistics Window or Screen Window. As in the example above, the logon window would be created with that HTML and therefore the reference to 'window.opener' which directs it to the admProcessLogon function residing in the window which opened the logon window. These windows are temporary and only exist until the user either enters data and continues or acknowledges the Alert status.

Frame to Frame Communication and Management is provided by the Java Script in the Admin frame as a central point of control. Other than the Screen frame which controls the URL's (script pages) being displayed, the admin.html specifies the URL's which are displayed in all frames of the AWS and in the Screen frame while between calls or on break.

Termination Code Frame

The Termination Code Frame is responsible for providing the graphical object representations of the available termination codes which the agent may use on a specific call. These graphics will be assigned using a modified Termcode editor and stored in a DAVOX generated HTML page which is displayed at time of screen pop in the Termination Code Frame. The generated HTML anchors each of the individual graphics with an onClick event handler such that a generic Java Script tcode function is called which invokes the appropriate API Applet method communicating the termcode to the WSAPI. An example of a tcode HTML (to process the termcodes shown in the BUI window) is presented below.

```
<SCRIPT>
function promptResponse (str)
    {
    parent.admin.document.APIApplet.tcodeRequest(str)
    }
</SCRIPT>
```

-continued

```
<A HREF=dummyRef NAME=Sale
onClick="promptResponse('Sale');return false;">
<IMG SRC=images/tcode_sale.gif>
</A>
```

Status Frame

The Status Frame is used to Display Agent Statistics and Campaign Statistics which are of importance to the individual Agent working the Campaign. These will be graphical and graphical/text displays of Result codes, Sales, Dollars etc. in Pie Charts and/or graphs. The displays will be driven by an Applet which is in communication with the Unison Statistics Server and Database. The specific Statistics which are displayed here have not yet been defined, however these will be customizable by the supervisor.

Screen Frame

The Screen Frame is responsible for all Agent Script display. It is the equivalent of the Power Scripting portion of the Davox VT100 Unison Display which has been HTML'd and Webbed. The initial page is a URL built from the initial "page" which is passed to the API Applet from the WSAPI. Embedded within the HTML is Java Script and Java Applets which enhance the capabilities of the browser by providing Record Data field access/update, Branching Logic and special functions such as Data sets, order entry etc.

The first release of the AWS will be Netscape 3.01 compatible. As the other browser vendors continue to adopt the industry standards, these will also be qualified for use. Since the software is Browser enabled it will run on any hardware platform supporting the Netscape 3.01. This includes PC, Mac Unix workstation, and several Network Computers.

{NOTE: Originally pages 99–109 of the Specification.}

Overview of HostConn

The Agent Work or Web Station (AWS) 70 will need to access and display data which is kept in one or more corporate databases 36. Typically, all data that is required to manage a call will be included in the call record via the daily or real-time trickled downloads. However there are cases where direct access to corporate databases are required from the AWS.

Example of some reasons are where the AWS must access the database are where the client database is massive and cannot be downloaded (especially the case of inbound call campaigns), the most current state of the database needs to be presented, or the database is a legacy type closed database (screen access only).

HostConn Objects

To accomplish this connection to a database, custom HostConn objects will be installed on a custom portion of the Admin frame in the agent BUI. The web pages can access these applets via javascript. These objects might be just applets or a mixture of javascript, applets, and activeX. The objects will have a minimal visual component, clicking on it will allow the user to display status and activity.

An instance of each HostConn object will be started for each database to be accessed. The number of HostConn objects is loosely defined, but typically will be one for each database or terminal session on each host.

There are 4 (four) types of HostConn objects:

1. Screen Scraper Open Connect—server The Open Connect applets will access any 3270/5250 Host screen, via a server.
2. Screen Scraper SBglue—local terminal emulator The SBglue objects will access any Davox® PC Smart Button(tm) supported terminal emulators. (requires additional local client software, and windows PC).

3. Database JDBC—server JDBC applets are will access any database from a two tier JDBC server, which will be able to access any network database. (requires establishing a jdbc web server).
4. Database ODBC—local ODBC objects will access any ODBC database. (requires additional local client software, and windows PC).

HostConn Wizard

The HostConn Wizard need to be able to gather information on the number of HostConn objects to put in the custom portion of the Admin frame. The parameters passed to these objects will be the name of the host and database to access, the login and password information, and whether to login from the start or on first access.

In the case of Screen Scraper objects, the HostConn Wizard will also help the user define parameters to associate table names with keystroke strings which access a specific screens. Updatable field names will be associated with table names and keystrokes required to update a specific field.

ScreenLogic Builder

The ScreenLogic Builder will then be able to display the list of available HostConn sessions defined by the HostConn Wizard, and the available tables for each session. The ScreenLogic Builder will then allow the user to pick any field from these tables, to add to any web page. ScreenLogic will display the field as a javascript function on the HostConn objects.

Agent Web Station HostConn Components

Screen Scraping

Screen Scraping is used to access Legacy brand host databases by using terminal emulation sessions. The emulators can be hidden, but they are communicated with to navigate to different screens by sending keystrokes. The data on any screen can be read by specifying the row, column and length of interest.

Updating a database field often requires accessing a different screen than the one used to display the data. The key sequences to enter the data may also require special field clear and enter keys. To keep the Screen Scraping as similar as possible to other Database data, table names are associated with keystroke sequences used to get to the screen which displays the data. To read a field, only the table name and specific row, column and length need to be passed to the host session applet which will then access that screen associated with the table, and return the data at the position specified.

For updates, a different table name (screen locator) may need to specified. An update field name will be associated with pre-data and post-data keystroke sequences. These are the necessary special keys to post the edit. To update a field, the table name, the update field name, and the new data need to be passed to the host session applet.

Open Connect—Server

{Note: Delete logo.}

The Webconnect and openvista software from Open Connect is a Server based host access software. This server software is included with Netra J server software from SUN. The server based emulation is preferred over local emulators discussed next, because the server emulators are administered centrally and do not require the heavy load on the PC which a local emulator requires. Server based emulators will run on any type of workstation, not just a PC since no software installation is required on the client other than a browser that supports java, it is far easier to install if no terminal emulator currently exists on the client workstation.

Figure 6:
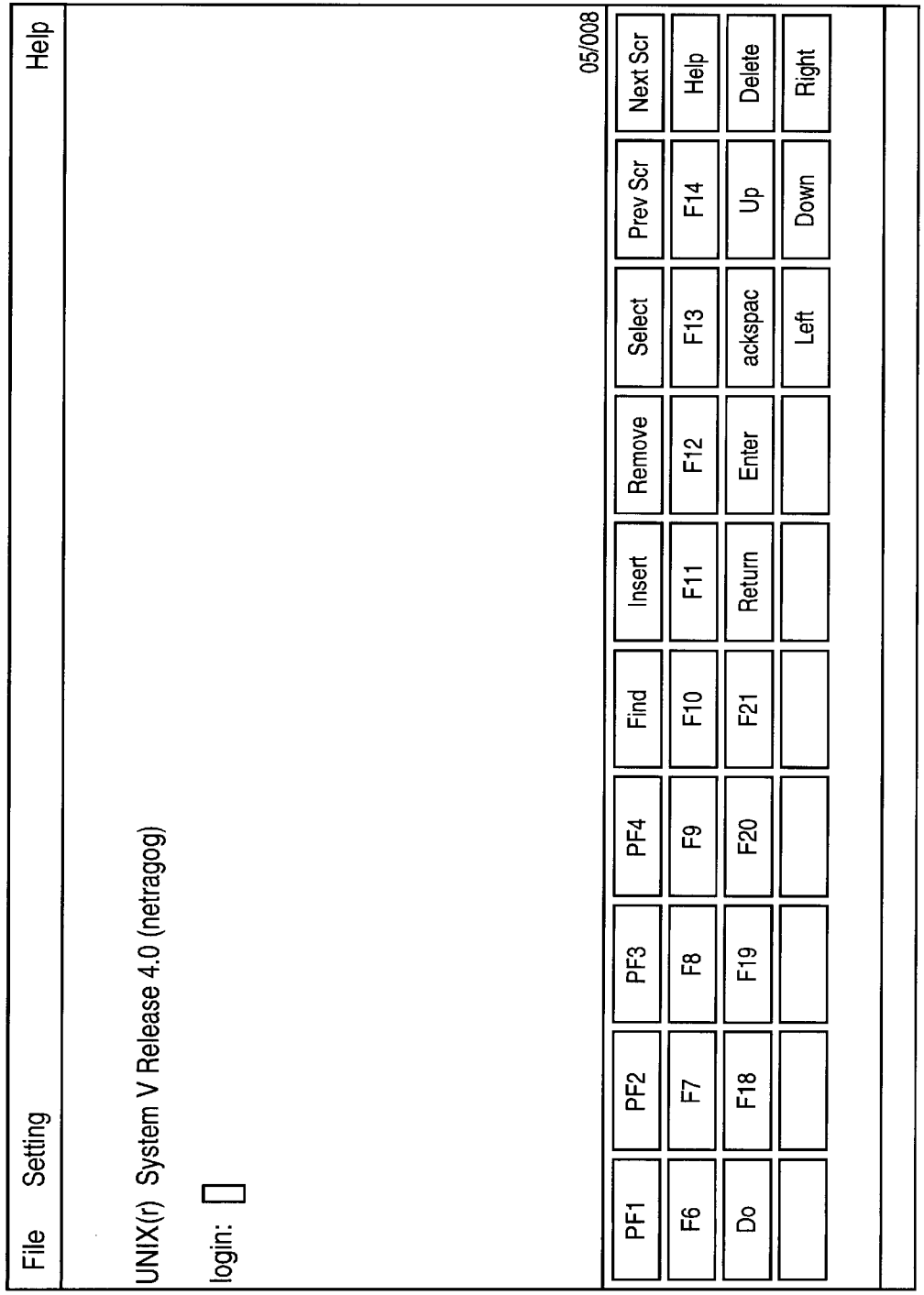
FIG. 6 is a reproduction of a computer splash screen illustrating a terminal emulator Java applet from Open Connect which communicates with its associated server to act as a proxy/router for providing a connection with a host.

FIG. 6 shows the terminal emulator applet provided with the WebConnect server package from Open Connect. The Java Applet communicates with the server it came from, which acts as a proxy/router and connects to the actual host.
{Note: Illustration is now FIG. 6 of the drawings.}

As an example, the following is the html code used to start the above emulator WebConnect.class:

```
<applet archive=WebConnect.zip code=WebConnect.class
    width=500 height=25>
<param name="host" value="192.168.120.78">
<PARAM NAME="cabbase" value="WebConnect.cab">
<param name="port" value="3270">
<param name="session" value="hostgog.ses">
<param name="beepfile" value="beep.au">
<param name="emulation" value="3270">
<param name="autostart" value="192.168.120.78:83">
<param name="button" value="New hostgog">
<param name="fontsize" value="12">
<param name="clickpad" value="ON">
<param name="langname" value="en_US">
<param name="htmlport" value="83">
</applet>
```

Similar html code to this would be embedded in the custom portion of the Admin frame on the BUI for each terminal emulation session to be started. Additional parameters or identified files stored on the server would contain the login and password information, and whether to login from the start or later, table names associated with keystroke strings which access a specific screens, update field names associated with pre-data and post-data strings.

The following methods are supported.

getData(tablename,row,col,len)

setData(tablename,fieldname,value)

Local Terminal Emulator

Some users may already have terminal emulators installed on their PC workstation, and will want to use that emulator rather than the server based emulator. This is not the preferred approach as it has numerous limitations. But there may be a host for which the user has a terminal emulator, but is not accessible via the WebConnect software. In this case, will be required is that the local terminal emulator runs on a PC with windows 95, and that the terminal emulator can be controlled via HLLAPI calls or DDE or OCX. The degree of control must be such that keystrokes can be sent, the screen can be read and conditional delays or screen status can be checked.

Figure 7:
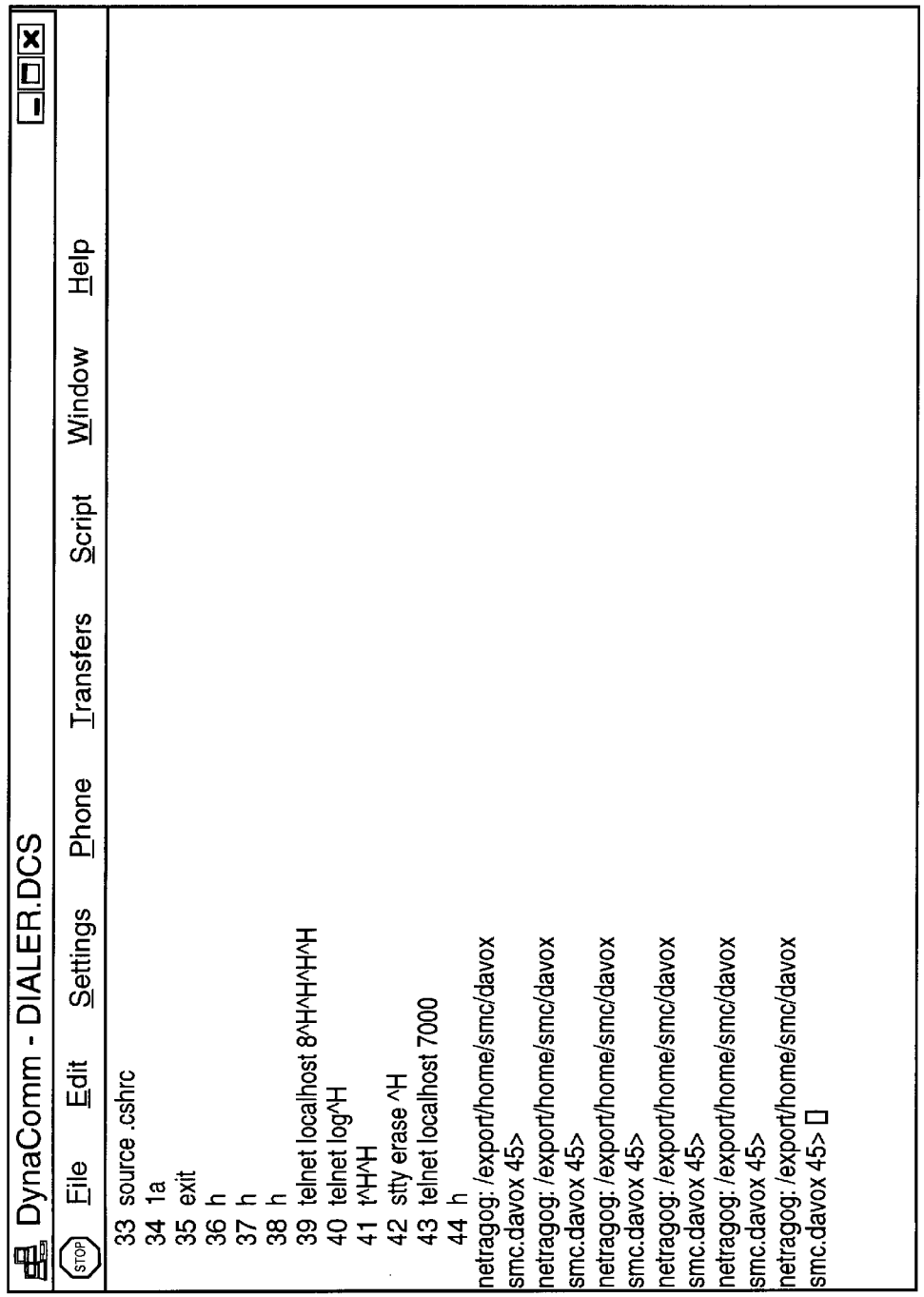
FIG. 7 is a reproduction of a computer splash screen illustrating a local terminal emulator from Dynacomm which allows keystrokes to be sent, screen reading, and delays and screen status to be monitored.

One example of a supported terminal emulator supported by SBglue is Dynacomm. And example Dynacomm screen is shown as FIG. 7. This terminal emulator would be running as a separate application on the PC.
{Note: Illustration is now FIG. 7 of the drawings.}
The screen shown in FIG. 7 can be accessed from Internet Explorer by use of the DAVOX SBweb OCX, which calls the DAVOX sbglue32.dll. These two packages should be installed on the PC, but can be downloaded from the web server using Microsoft's CAB techniques.

Figure 8:
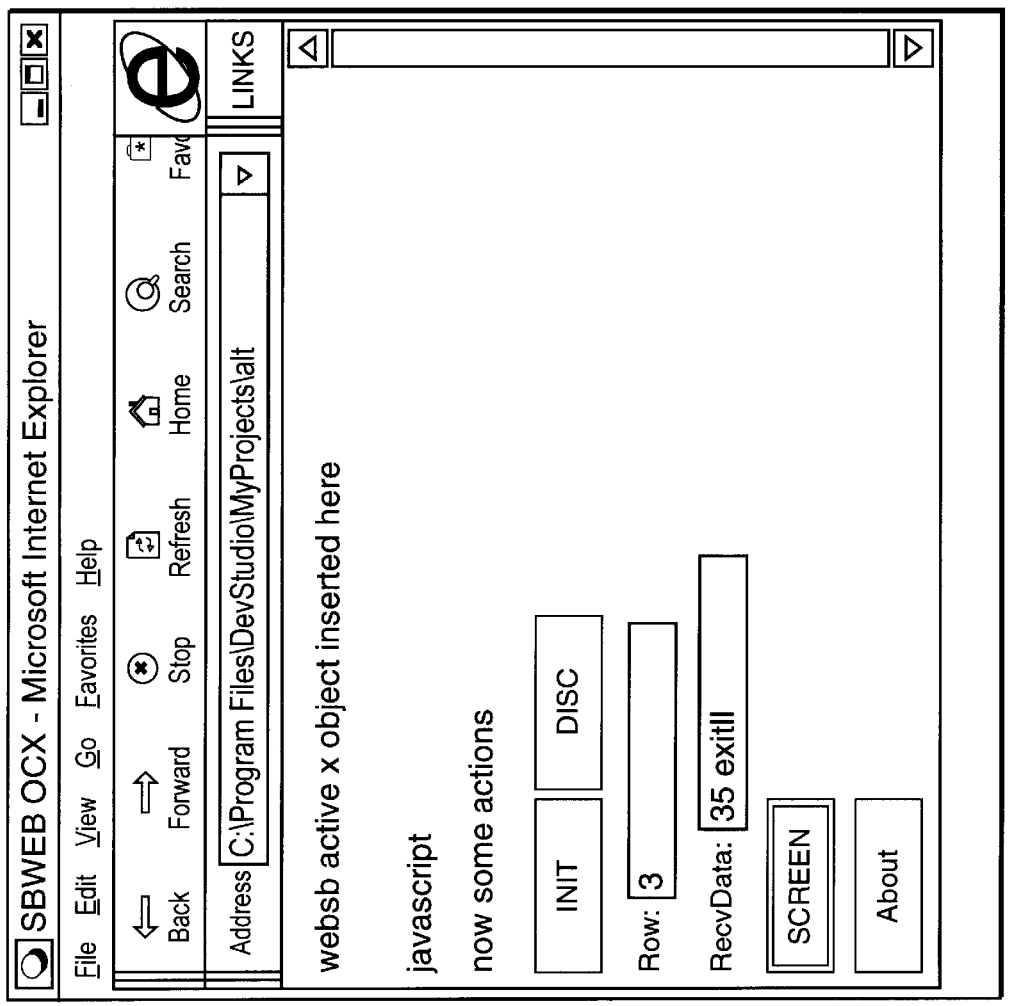
FIG. 8 is a reproduction of a computer splash screen illustrating a Web page accessing a local terminal emulator from Dynacomm as shown in FIG. 7.

FIG. 8 is an example of a web page accessing the Dynacomm emulator.
{Note: Illustration is now FIG. 8 of the drawings.}
The following is the html code for the page embedding the sbweb.ocx shown in FIG. 8:

```
<OBJECT ID="Websb1" WIDTH=100 HEIGHT=50
    CLASSID="CLSID:FF48F245-A623-11D0-8864-00009290EE10">
    <PARAM NAME="_Version" VALUE="65536">
    <PARAM NAME="_ExtentX" VALUE="2117">
```

-continued

```
    <PARAM NAME="_ExtentY" VALUE="1058">
    <PARAM NAME="_StockProps" VALUE="0">
</OBJECT>
<SCRIPT>
function js_sb1( )
Websb1.Package = "DYNACOMM"
Websb1.TopicName = "adialer.dct"
Websb1.Initialize( )
Websb1.Connect( )
Websb1.Status( )
form1.retv.value = Websb1.RecvData
}
</SCRIPT>
```

Code similar to this would be embedded in the custom portion of the admin frame on the BUI for each local terminal emulation session to be started. Additional parameters would contain the login and password information, and whether to login from the start or later, table names associated with keystroke strings which access a specific screens, and update field names associated with pre-data and post-data strings.

The following methods are supported.

getData(tablename,row,col,len)

setData(tablename,fieldname,value)

Database Access

JDBC—Server

The Java API used to access databases is called JDBC. The Web Station Admin makes use of JDBC to access the Sybase database on the Unison server. JDBC—server access described in this section are Drivers of Type 3 and 4 described below.

3. A net-protocol all-Java driver translates JDBC calls into a DBMS-independent net protocol which is then translated to a DBMS protocol by a server. This net server middleware is able to connect its all Java clients to many different databases. The specific protocol used depends on the vendor. In general, this is the most flexible JDBC alternative. It is likely that all vendors of this solution will provide products suitable for Intranet use.

4. A native-protocol all-Java driver converts JDBC calls into the network protocol used by DBMSs directly. This allows a direct call from the client machine to the DBMS server and is a practical solution for Intranet access. Since many of these protocols are proprietary, the database vendors themselves will be the primary source for this style of driver.

The distinguishing point in JDBC—server access that this API can be made from inside a Java Applet without violating security constraints. To meet this requirement, the must have a system with access to the database, and a minimal http server to serve the JDBCdbversion.class java applet for that database.

Figure 9:
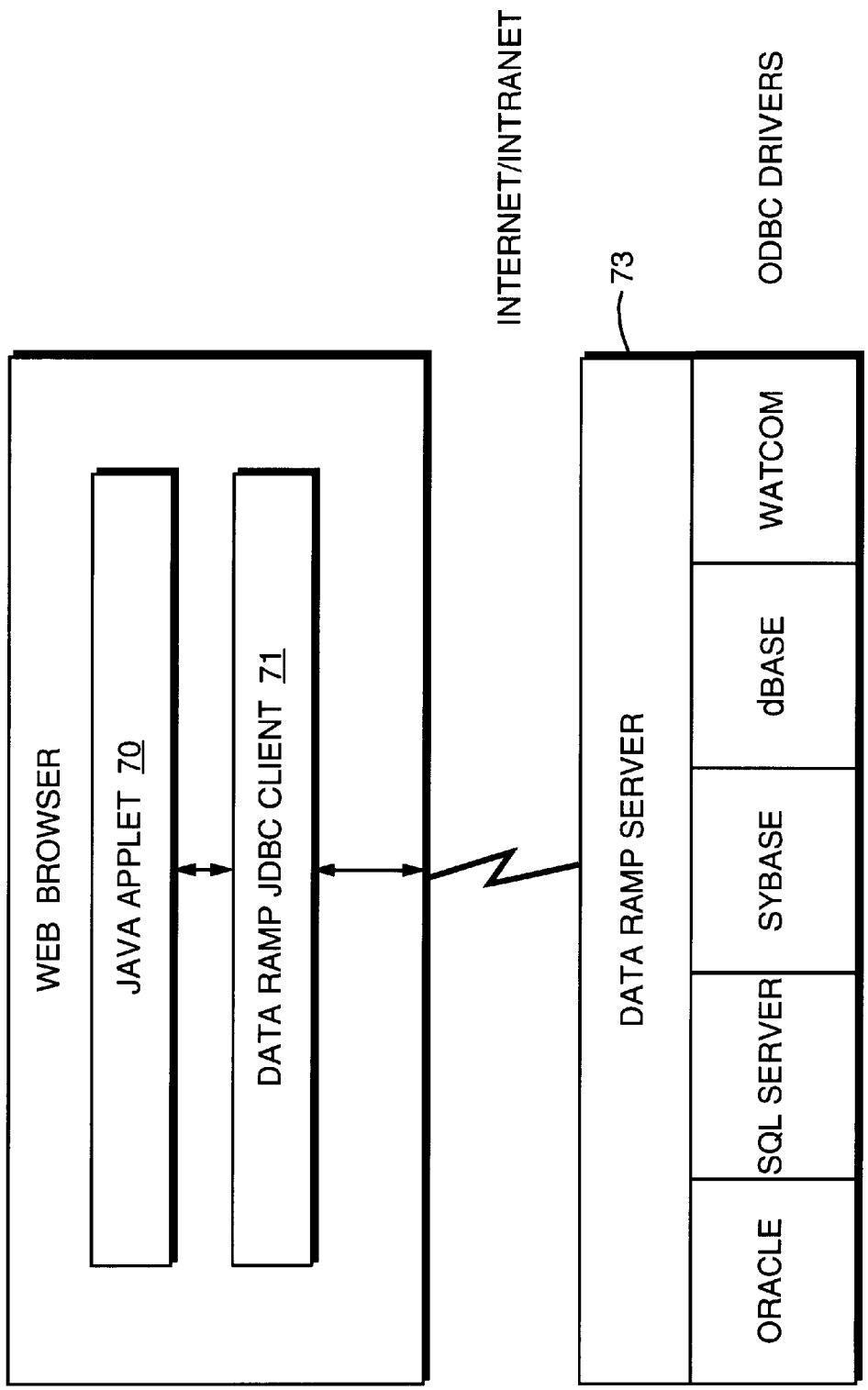
FIG. 9 is a schematic representation of a JDBCdataramp class database access client deployed from an winNT server, running a DataRamp server.

{Note: Illustration is now FIG. 9 of the drawings.}
An example as shown in FIG. 9 would be JDBCdataramp class client 71 deployed from an winNT server, running DataRamp server 73. This would permit access to any ODBC database accessible to the winNT server. (Note these ODBC databases may already be accessible to the client workstation but the Java 1.0x security model prohibits applets from accessing native libraries.) If the winNT server is the actual server of the ODBC database, no network penalty is lost by going through the http (Microsoft internet) server.

(Note: Delete illustration.)

Figure 10:
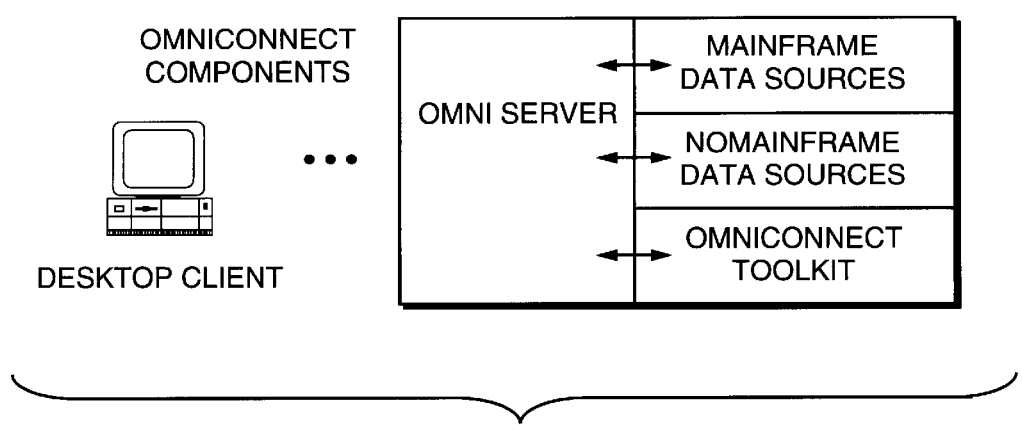
FIG. 10 is schematic representation of a JDBCsybase. class database access client deployed on an NT or Sparc workstation.

In another example, FIG. 10 illustrates a JDBCsybase.class database access API client deployed on an NT or Sparc workstation running Jaguar CTS, or a Sybase server running OmniCONNECT or DirectCONNECT middleware products. Here, a Sybase jconnect jdbc driver would be used.

{Note: Illustration is now FIG. 10 of the drawings.}

In all cases, the JDBCdbversion.class java applets would all take the same parameters (the database name, login, password and connect option). One applet should be added for each database. The applets will be installed on a custom portion of the admin frame in the agent BUI. The web pages can access these applets via javascript.

All would support the same methods, namely getData(tablename,fieldname)

setData(tablename,fieldname,value)

Conversion to and from string is implied for all data base types.

ODBC—Local

Some users will already have access to their corporate databases already installed on their PC workstation, and will want to use them rather than the server based middleware. This local method is not the preferred approach as it has numerous limitations. What will be required is that the local database access is ODBC 2 and runs on a PC with windows 95.

The ODBClocal OCX would all take the same parameters (the database name, login, password and connect option). One object should be added for each database. The objects will be installed on a custom portion of the admin frame in the agent BUI. The web pages can access these objects via javascript and will support the methods:

getData(tablename,fieldname)

setData(tablename,fieldname,value)

HostConn Components

HostConn Wizard

A HostConn wizard is preferably written in powerbuilder, to run on the Supervisor system. It will be used to determine all the databases and tables and updatable fields to be available to the ScreenLogic Builder. The necessary applets and objects and javascript will be added to the custom portion of the admin window.

The HostConn Wizard is separate from the ScreenLogic Builder in that it requires a system with live HostConnectivity to run. The data it captures is all that is needed by ScreenBuilder to make data selections off-line. In addition, the HostConn Wizard should be run by someone with knowledge about the Host DataBases and Terminal sequences, and will be best at deciding which fields to permit write access. However, the HostConn Wizard can (an typically will) be run on the same PC that runs ScreenLogic.

Screen Scraping

The HostConn wizard will activate the desired terminal emulator, and let the user enter and test various keystroke strings as means to login and to access different screens. Successful sequences can be stored away and associated with table names. Additionally, for each table, a screen snapshot will be stored. Strings used to update specific update fields will also be tested.

The HostConn wizard will open the desired database connection, and display available tables for that login. Selected tables will be stored away, along with all the fields available for each table. The user will be asked to identify those fields (if any) which ScreenLogic Builder will be allowed to update.

ScreenLogic Builder

When the user of ScreenLogic Builder selects HostConn Data Object, a list of available HostConn sessions defined by the HostConn Wizard will be displayed. From each session, a list of available tables will be displayed. If a table is selected, and the session is a database type, a list of fields are displayed from which the user can pick. If the user is planning to create an updatable field, the user will be displayed a list of updatable fields for that table, defined by the HostConn Wizard.

Screen Scraping

Figure 11:
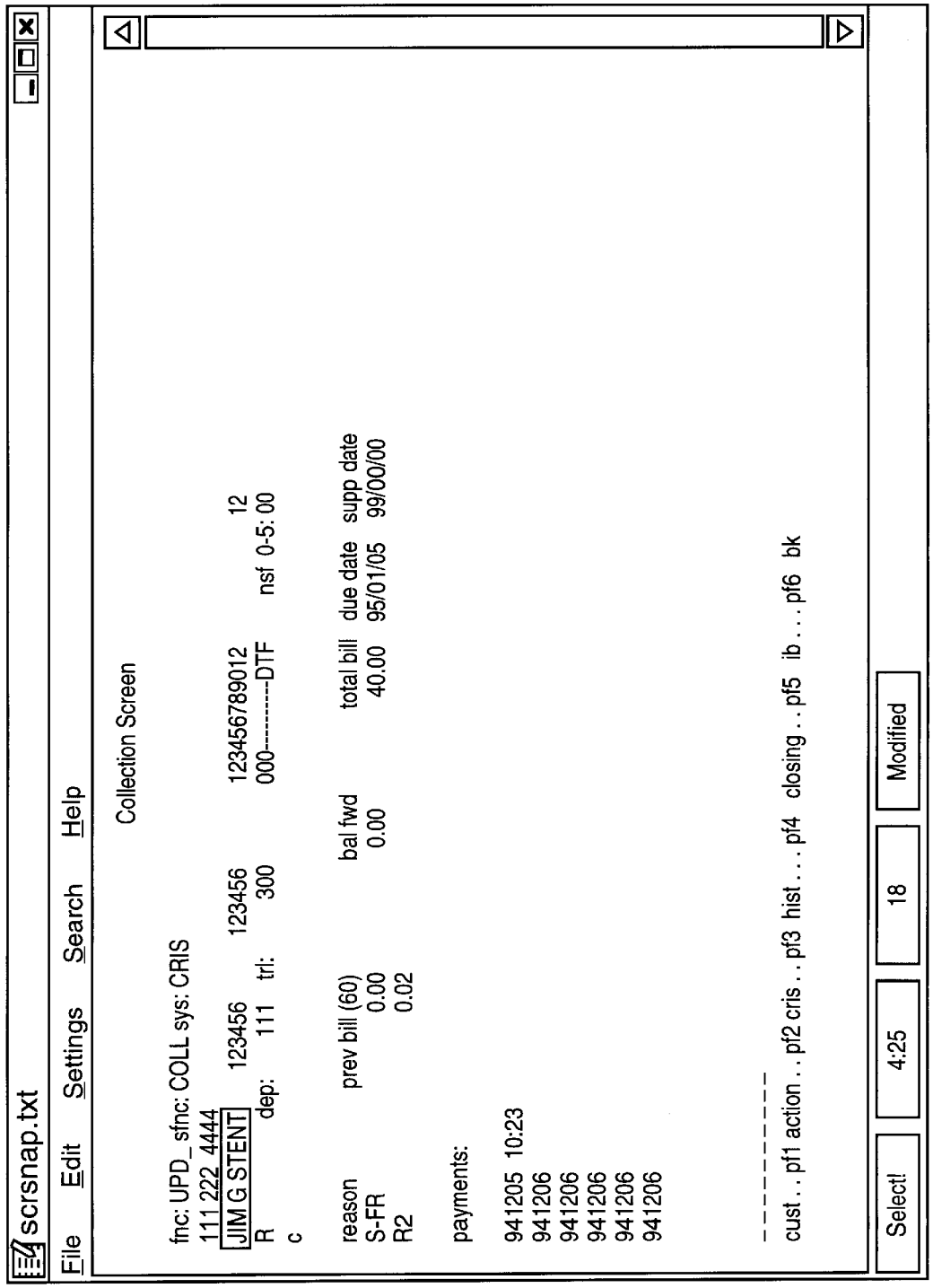
FIG. 11 is a reproduction of a computer splash screen illustrating screen of database fields which the user can update.

If the session is a screen scraper type for the table selected, the user will be shown a screen shot, FIG. 11. The user can then highlight the row, column, length of interest.

{Note: Illustration is now FIG. 11 of the drawings.}

If the user is planning to create an updatable field, the user will be displayed a list of updatable fields for that table. The user will then be asked for the table and screen data (if any) to preload the updatable field. Note that the screen to read the current value of an updatable field may not be the same screen where the update is done.

{NOTE: Originally pages 117–122 of the Specification.}

Overview of the Agent Web Station User Interface Components

The User Interface Components are the set of objects that can be modified using the Supervisor Console. The goal is to allow the supervisor to use a graphical tool for all customization of agent screen items, both visible (UI) and invisible (logic) Thus, the supervision will not be required to write any code. The disclosed builder tool will generate the HTML pages for the campaign. The component library may contain objects as simple as buttons or as complex as order forms, appointment schedulers, etc.

Java, JavaBeans and JavaScript

Components can be written in Java, JavaBeans, or JavaScript. Which one is used for a specific component will depend on its intended use. JavaScript source code is visible and editable in the HTML page, whereas Java class files are distributed in a compiled form, which hides their source code. Simple components, such as a single button, text field, etc. can be written in JavaScript, while more complex components may be provided as applets. Implementation of applets may be, for example, written in version 1.0.2 of the Java Development Kit. However, it is envisioned that additional implementations may be written in later versions of the Java Development Kit, such as version 1.1. Furthermore, previously written applets may be migrated to later versions of the Java Development Kit as well. Table 1 lists the advantages and disadvantages of the various language options available.

{NOTE: Table 1 moved to next paragraph.}

According to JavaSoft, a Java Bean is a reusable software component that can be visually manipulated in builder tools. This is done by implementing standard interfaces in the Beans which the builder tool can query and/or modify as required. Components can be as simple

TABLE 1

| Language | Advantages | Disadvantages |
| --- | --- | --- |
| Java | Distributed as compiled objects; source code hidden Builder tool does not need to generate code, just the parameters for the <APPLET> tag in the HTML | More Complex for simple components. Browser support for different Java versions varies |

TABLE 1-continued

| Language | Advantages | Disadvantages |
|---|---|---|
| Java-Beans | Reusable components manipulable by builder tool. | Not supported until Java version 1.1 |
| Java-Script | Contained in HTML file and compiled at run-time. Written directly to HTML page by builder tool. | Source code is visible in the HTML page. Builder tool must be capable of generating complete source code. | as a button or as complex as an order entry form or calculator. While all useful components should be implemented as JavaBeans, there are a number of factors that should be considered in determining whether to implement a useful component as a JavaBean. These factors include:

Beans can be nested.

The difference between a Bean and an instance of a class is called introspection, the ability of a builder to manipulate the state.

Beans can be used by JavaScript builders such as Netscape's Visual JavaScript.

Converting an existing class to a JavaBean is a relatively simple process. First, two methods are added to the class by either modifying or subcassing the class. Next, since a class must implement Serializable, it must be added if it is not already present in the class. The following examples illustrate how JavaBeans may be programmed to implement specific functions.

To add a property to a JavaBean, an instance variable must first be created. Then, the two methods required to query or set the instance variable must be defined. These steps can be implement using the following software steps:

```
private Color beanColor = Color.blue;
public Color getColor( ) {
    return beanColor;
}
public Color setColor(Color newColor) {
    beanColor = newColor;
    repaint( );
}
``` to make a JavaBean an "even source" to which other Beans may respond, the following software steps my be utilized:

```
import java.awt.event.*;
import java.util.vector;
...
public synchronized void addTYPE(TYPE listener) {
    listeners.addElement(listener);
}
public synchronized void removeTYPE(TYPE, listener) {
    listeners.removeElement(listener);
}
...
private Vector listeners = new Vector( ); //list of
registered listeners
```

To make the JavaBean an "event listener", which will receive notification of certain events, the following software steps may be utilized:

```
SourceObject.addTYPE(this);
SourceObject.removeTYPE(this); //when no longer
    interested in events of TYPE
```

Applet Architecture

One goal of the disclosed invention is to provide a Supervisor Console with a set of customizable controls in the form of JavaBeans, which will be implemented in Java 1.1 when this version of Java is supported by web browsers with a major market share, such as Netscape Navigator, Microsoft Internet Explorer and others. However, even without implementing the new event method or "JavaBeans", as discussed, it is possible to have "customized" applets to be embedded in generated HTML pages. This is accomplished by making extensive use of applet parameters with consistent names across the library of applets. However, even without implementing the new event method or "JavaBeans", as discussed below, the disclosed invention still "customized" applets to be embedded in generated HTML pages. This is accomplished by making extensive use of applet parameters with consistent names across the library of applets. All applets will implement properties via these parameters.

Setting Properties with Parameters

The Supervisor Console builder will generate HTML pages containing applet tags to call the desired applets. Due to the implementation under PowerBuilder, each applet will be passed a single parameter, param1, containing a series of name-value pairs in the format: <param name="param1" value="firstparam=1,second=2"> etc.

Generic properties include foreground/background colors, font, quantity (multi-control sets), etc. The generic parameter names are provided in Table 2.

TABLE 2

| Name | R/O | Type | Description |
|---|---|---|---|
| bgColor | Opt | Integer | Applet background color. Not all components inherit this value (e.g., buttons). |
| fgColor | Opt | Integer | Applet foreground color. Not all components inherit this value. |
| qty | Req | Integer | Number of controls in multi-control set (e.g., button bar) (may also be implemented as an optional property for some applications.) |
| fontName | Opt | String | Client-sensitive; may not resolve "nonstandard" names such as "Comic Sans MS" at run-time. |
| fontStyle | Opt | Integer | Sum of the constants PLAIN = 0 (Default), BOLD = 1, ITALIC = 2. |
| fontSize | Opt | Integer | In points from 6–120. |

List of Applets

A Button Bar applet provides a set of buttons with text labels that executes a showDocument in the current frame. Required parameters include; the number of buttons(qty), the button labels, the URL of the document to be shown, and the name of the frame in which to show the document. The parameters associated with Button Bars are shown in Table 3.

{NOTE: Table 3 moved below.}

An Image Button Bar applet serves the same function as the Button Bar applet. However, the buttons contain images rather than text labels. Parameters required for an Image Button Bar include; qty, name, image, URL and frame. The parameters associated with Image Buttom Bars are shown in Table 4.

{NOTE: Table 4 moved below.}

Although not specifically listed, the same principles can be applied to provide additional applets, including Clock applet, which would provide a supervisor with a time/date display. Of course the supervisor would be capable of selecting date/time format, colors, font, etc.

TABLE 3

| Name | R/O | Type | Description |
|---|---|---|---|
| qty | Req | Integer | Number of buttons in the button bar. |
| fontName | Opt | String | Name of the font for the button labels. |
| fontStyle | Opt | Integer | Sum of the constants PLAIN = 0 (Default), BOLD = 1, ITALIC = 2 |
| fontSize | Opt | Integer | Size in points from 6–120 |
| button_x_label | Req | String | Label to be displayed on button x |
| button_x_action | Req | String | URL of document to load |
| button_x_target | Req | String | Target frame in which to show document. Default is self. |

| Name | R/O | Type | Description |
|---|---|---|---|
| qty | Req | Integer | Number of image buttons in the button bar. |
| button_x_image | Req | String | URL of the image for button x |
| button_x_action | Req | String | URL of document to show when x is clicked |
| button_x_target | Req | String | Target frame in which to show document. Default is self. |

Calendar applet provides a month view and can in phase 2 be used as part of the appointment scheduling system. Likewise, a Calendar applet may be provided to offer a supervisor a month view. Additional embodiments of the invention may utilize the Calendar applet as a key component of a scheduling system.
{NOTE: Delete calendar illustration.}

Radio Button Bar applets may also be provided to present a single-selection, multiple-choice option, such as a type of credit card (e.g. MasterCard®, VISA®, Discover®, etc Checkbox Bar applets may also be provided to present multiple-selection, multiple-choice options. In such a Checkbox Bar, one or more presented choices may be selected. Lisbox applets may also be provided offer a drop-down selection list of choices that may be selected. Additional applets may include Credit Card Verification applets, Pie Chart applets, Bar Chart Applets, Pop-up Calculator applets, Order Form applets, and others.

Documentation

The disclosed Agent Web Station User Interface will also include user documentation, which will allow users to more easily understand the functionality of each applet. Of course, the user documentation should make specific mention of all applet properties, parameters, size requirements, and return value(s) if applicable. The user documentation must also use Javadoc conventions,
implement getAppletInfo( ), and
implement getParameterInfo( ).

Tools

Development tools useful in developing the Components include:
Java Development Kit (JDK) 1.0.2, 1.1, and 1.1.1 (Note that Java API version 1.0.2 is most widely supported by currently available web browsers. However, version 1.1.1 will be incorporated into both Internet Explorer 4.0 and Netscape Navigator 4.0.);
Microsoft's Application Foundation Classes (AFDC);
Java Foundation Classes (JFC) (JFC is the Java equivalent of the Microsoft Foundation Classes (MFC)); the Java Abstract Windowing Toolkit (AWT); and Netscape's Internet Foundation Classes (IFC).
Symantec Visual Cafe Pro development of JavaBeans components.
and Borland JBuilder will also support the development of JavaBeans components.

Netscape Visual JavaScript, which is a graphical builder tool that allows users to assemble applications out of JavaBean components without writing code, may also be used.

{NOTE: Originally pages 15–28 of the Specification.}

EXEMPLARY EMBODIMENT OF THE INVENTION

The following are examples of program segments, including field, constructor and method indices and definitions useful in practicing one embodiment of the present invention.

Interface davox.admin.AdminInterface

"public interface Admininterface" is the interface implemented by AdminApplet (and by proxy AdminAppletDemo). The principle purpose of this interface is to allow the hostconn and dataset applets to call into the admin applet by casting an applet to AdminApplet. However, they must cast to an interface because of how the demo form of admin is built. In short this results in two applets; AdminApplet, which extends Admin and AdminAppletDemo, which extends AdminStub. As can be appreciated to those skilled in the art, there is no common base class that could be casted too. Hence the use of this interface. Note that only the methods that will be called from other Java applets are required. Those methods that will be called from JavaScript are not included. The following are an index and the definitions of a number of the methods that will be called.

Method Index
[• getAgentName
• getAgentPassword
• getDBField
• getTacField
• setUserField
• setDBField
• getUserField]
    getDBField
    setDBField
    getTacField
    setUserField
    getUserField
    getAgentName
    getAgentPassword
Method Definitions
    getDBField
        public abstract String getDBField(String field)
    setDBField
        public abstract boolean setDBField(String field,
                      String value)
    getTacField
        public abstract String getTacField(String field)
    setUserField
        public abstract void setUserField(String fieldName,
                      String fieldValue)

-continued

```
    getUserField
        public abstract String getUserField(String field)
    getAgentName
        public abstract String getAgentName( )
    getAgentPassword
        public abstract String getAgentPassword( )
{Note: Delete Footer.}
{NOTE: Delete header.}
Class davox.admin.Admin
[java.long.Object
      |
      +----java.awt.Component
            |
            +----java.awt.Container
                  |
                  +----java.awt.Panel
                        |
```

-continued

```
                              +----java.applet.Applet
                                    |
                                    +----davox.admin.Admin]
"public class Admin"[
``` extends an applet to allow an abstract base class to communicate with the Unison WSAPI server. An Admin applet, as detailed below, must extend this class and provide implementations for the abstract methods. The following are field, constructor and method indices along with field, constructor and method definitions associated with "public class Admin".

```
Field Index
    app_name
    client_host
        Agent Logon/Logoff methods.
    console
    form_name
    lastStatus
    leds
        LED and debug support
    LOGIN_STATUS_AVAIL
    LOGIN_STATUS_AVAILING
    LOGIN_STATUS_BREAK
    LOGIN_STATUS_BREAKING
    LOGIN_STATUS_LOGGING_OFF
    LOGIN_STATUS_LOGGING_ON
    LOGIN_STATUS_OFF
    LOGIN_STATUS_UNKNOWN
    loginStatus
    priorStatus
    promptCount
    props
Constructor Index
    Admin( )
Method Index
    admAvailResponse(int, String)
    admCampAddResponse(int, String)
    admCampRemoveResponse(int, String)
    admCampsResponse(int, String, String, String)
    admConnectionLost( )
    admEnable(String)
    admExcludeResponse(int, String)
    admLogoffResponse( )
    admLogonResponse(int, String)
        Abstract methods which must be defined by a class which
        extends Admin.
    admMessage(String)
    admPopUp(String, int)
    admPrompt(String, int)
    admRemoveData( )
    admSendData(String)
    admTacField(String, String)
    admUnavailResponse(int, String)
    avail( )
    availResponse(TrsMsgMsg)
    campAdd(String, int)
    campAddResponse(TrsMsgMsg)
    campRemove(String)
    campRemoveResponse(TrsMsgMsg)
    connectionLost( )
        Handles error when we lose the connection to
        wsapi.
    continueLogon( )
        Called from WsapiLogon.class.
    destroy( )
        Called by browser when applet is being destroyed.
```

-continued

```
exclude(String, String, String)
    Excludes a record from any further dial attempts
excludeResponse(TrsMsgMsg)
getAgentID( )
    Login ID
getCampaignName( )
getCamps( )
getClientHost( )
    Retrieve the ip address of the client system.
getDBField(String)
getTacField(String)
getUserField(String)
getVersion( )
    Admin applet version.
init( )
    Applet initialization.
jsGetCampsResponse( )
jsLog(String)
ledError(int)
ledOff(int)
ledOn(int)
logoff( )
    Process a logoff request.
logoffResponse(TrsMsgMsg)
    Called when we receive the message from wsapi accepting
    or rejecting our request to logoff.
logon(String, String)
    Logon to the Unison system.
logPage(String)
    Logging function for URLs.
process(TrsMsgMsg)
    Process a received message from the WAS.
promptResponse(String)
promptRespondTransfer(String, String)
    Send message with transfer termcode and digits to dial
setClientHost(String)
    Sets the ip address of the client system.
setDBField(String, String)
setUserField(String, String)
socketStressTest( )
    Diagnostic methods to stress test our JDBC connection.
start( )
    Called by browser when applet needs to be started (or
    restarted).
stop( )
    Called by browser when applet needs to be stopped.
unavail( )
unavailResponse(TrsMsgMsg)
vini( )
    Initialize a connection with WSAPI.
viniResponse( )
    Handles the response to the VINI message.
Field Definitions
    LOGIN_STATUS_UNKNOWN
        public final static int LOGIN_STATUS_UNKNOWN
    LOGIN_STATUS_OFF
        public final static int LOGIN_STATUS_OFF
    LOGIN_STATUS_BREAK
        public final static int LOGIN_STATUS_BREAK
    LOGIN_STATUS_AVAIL
        public final static int LOGIN_STATUS_AVAIL
    LOGIN_STATUS_LOGGING_ON
        public final static int LOGIN_STATUS_LOGGING_ON
    LOGIN_STATUS_LOGGING_OFF
        public final static int LOGIN_STATUS_LOGGING_OFF
    LOGIN_STATUS_BREAKING
        public final static int LOGIN_STATUS_BREAKING
    LOGIN_STATUS_AVAILING
        public final static int LOGIN_STATUS_AVAILING
    loginStatus
        public int loginStatus
    priorStatus
        public int priorStatus
    lastStatus
        public String lastStatus
    props
        public Properties props
    promptCount
        public int promptCount
```

```
form_name
    public String form_name
app_name
    public String app_name
console
    protected Console console
client_host
    protected String client_host
        Agent Logon/Logoff methods. Note part of logon
        include connecting to wsapi and Sybase. When agent
        logs off [we need to close]these connections must be
        closed.
leds
    public AdminLEDs leds
        LED and debug support
Constructor Definitions
    Admin
        public Admin( )
Method Definitions
    start
        public void start( )
            Called by browser when applet needs to be started
            (or restarted).
            Overrides:
                start in class Applet
    stop
        public void stop( )
            Called by browser when applet needs to be stopped.
            In response we must stop or suspend all running
            threads.
            Overrides:
                stop in class Applet
    destroy
        public void destroy( )
            Called by browser when applet is being destroyed. In
            response we must free any resources which would not
            otherwise be garbage collected.
            Overrides:
                destroy in class Applet
    init
        public void init( )
            Applet initialization. Called when applet first
            created. Performs one time initialization.
            Overrides:
                init in class Applet
    process
        protected void process(TrsMsgMsg msg)
            Process a received message from the WAS.
        Parameters:
            msg - message received from WSAPI
    setClientHost
        public void setClientHost(String client_host)
            Sets the ip address of the client system. In IE we
            are unable to determine this from Java code due to
            security exceptions. To workaround it we use a cgi
            script to determine the client's ip. Once the admin
            applet is initialized it displays this
            "setclientip.pl" in the screen frame which will call
            this method, setClientHost( ), then proceed to
            display the logon prompt in the screen frame.
    getClientHost
        public String getClientHost( )
            Retrieve the ip address of the client system. Call
            by stats collector.
    logon
        public void logon(String name,
                          String password)
            Logon to the Unison system. This method will issue a
            request to the Unison system to logon with the name
            [name]and the password[password]. Valid login
            name/password combinations are attained from the
            config.dbo.agent_define database table. This method
            will change the loginStatus to
            LOGIN_STATUS_LOGGING_ON
        Parameters:
            name - login name to pass to the Unison system
            password - password to pass to the Unison
            system
        Returns:
```

-continued

```
            true if the command was successfully sent,
            false otherwise.
continueLogon
    protected void continueLogon( )
        Called from WsapiLogon.class. Continues the login
        process started when logon( ) called. See logon( ) for
        details.
vini
    public void vini( )
        Initialize a connection with WSAPI. WSAPI requires a
        VINI command before a logon command can be sent
viniResponse
    public void viniResponse( )
        Handles the response to the VINI message. This is
        where we send the actual agent logon request.
logoff
    public void logoff( )
        Process a logoff request. This method will invoke a
        logoff request with a logoff level of
        LOGOFF_LEVEL_SOFT
logoffResponse
    public void logoffResponse(TrsMsgMsg msg)
        Called when we receive the message from wsapi
        accepting or rejecting our request to logoff.
connectionLost
    protected void connectionLost( )
        Handles error when we lose the connection to wsapi.
        Note this is only called from the WsapiRecv thread
        when an IOException occurs.
getVersion
    public String getVersion( )
        Admin applet version.
getCampaignName
    public String getCampaignName( )
getTacField
    public String getTacField(String field)
setUserField
    public void setUserField(String fieldName,
                             String fieldValue)
getUserField
    public String getUserField(String field)
promptRespond
    public boolean promptResponse(String text)
promptRespondTransfer
    public boolean promptRespondTransfer(String text,
                                         String digits)
        Send message with transfer termcode and digits to
        dial
        Parameters:
            text - termcode <F08> or <F09>
            digits - the digits to dial
        Returns:
            true
getCamps
    public void getCamps( )
jsGetCampsResponse
    public void jsGetCampsResponse( )
campAdd
    public void campAdd(String camp,
                        int level)
campAddResponse
    public void campAddResponse(TrsMsgMsg msg)
campRemove
    public void campRemove(String camp)
campRemoveResponse
    public void campRemoveResponse(TrsMsgMsg msg)
avail
    public void avail( )
availResponse
    public void availResponse(TrsMsgMsg msg)
unavail
    public void unavail( )
unavailResponse
    public void unavailResponse(TrsMsgMsg msg)
getDBField
    public String getDBField(String field)
setDBField
    public boolean setDBField(String field,
                              String value)
```

-continued

```
exclude
    public boolean exclude(String app_name,
                           String field_name,
                           String data)
        Excludes a record from any further dial attempts
        Returns:
            true
excludeResponse
    public void excludeResponse(TrsMsgMsg msg)
    Parameters:
        msg - TrsMsgMsg created by exclude
jsLog
    public void jsLog(String str)
logPage
    public void logPage(String url)
        Logging function for URLs.
        Parameters:
            url - the address of the page to be loaded.
        Returns:
            none
getAgentID
    public String getAgentID( )
        Login ID
        Returns:
            agent_id
ledOn
    public void ledOn(int led)
ledOff
    public void ledOff(int led)
ledError
    public void ledError(int led)
socketStressTest
    public void socketStressTest( )
        Diagnostic method to stress test our JDBC
        connection. This method loops infinitely sending a
        bogus termcode for the current call and rereading
        the database record. In effect, this continuously
        exercises our WSAPI and Sybase connections with both
        reads and writes.
admLogonResponse
    protected abstract void admLogonResponse(int statusCode,
                                             String statusString)
        Abstract methods which must be defined by a class
        which extends Admin.
admSendData
    protected abstract void admSendData(String urlString)
admLogoffResponse
    protected abstract void admLogoffResponse( )
admEnable
    protected abstract void admEnable(String campaigns)
admPrompt
    protected abstract void admPrompt(String promptString,
                                      int size)
admPopUp
    protected abstract void admPopUp(String promptString,
                                     int size)
admMessage
    protected abstract void admMessage(String promptString)
admRemoveData
    protected abstract void admRemoveData( )
admTacField
    protected abstract void admTacField(String tac_field,
                                        String tac_value)
admCampsResponse
    protected abstract void admCampsResponse(int statusCode,
                                             String statusString,
                                             String campsOn,
                                             String campsAvail)
admCampAddResponse
    protected abstract void admCampAddResponse(int statusCode,
                                               String statusString)
admCampRemoveResponse
    protected abstract void admCampRemoveResponse(int statusCode),
                                                  String statusString)
admAvailResponse
    protected abstract void admAvailResponse(int statusCode,
                                             String statusString)
admUnavailResponse
    protected abstract void admUnavailResponse(int statusCode,
```

-continued

```
                                      String statusString)
admExcludeResponse
    protected abstract void admExcludeResponse(int statusCode,
                                      String statusString)
admConnectionLost
    protected abstract void admConnectionLost( )
```

{Note: Delete Footer.}
(NOTE: Originally pages 29–89 of the Specification.)
The Admin Applet The Admin applet provides a connectivity path to the Unison servers via the trs.msg package. The Admin connects to the Unison WSAPI server. There are subtle differences between the trsmsg connectivity to WSAPI compared to the CLAPI connection. Details regarding these differences will be heighlighted below.

The "Admin" is essentially a Davox specific communication mechanism for browser connectivity to the Unison system. Admin makes use of the trs.msg package to communicate directly to Unison servers. Due to the security restrictions on web browsers the connectivity to Unison servers is limited to the machine that downloads the applet to the browser. This will generate a requirement for a gateway server for connection to Unison servers that reside on more than one physical box.

Admin also provides database connectivity by implementing the jdbc class. The jdbc (Java Database Connectivity) class allows Admin to communicate directly with the Sybase dataserver. The jdbc connection is also restricted to the same connectivity restraints which limit trs.msg connectivity. Thus, if there is a need for connection to multiple dataservers which reside on separate physical boxes a gateway dataserver will have to be implemented.

The third communication path implemented by Admin is the http communication. This is the native communication mechanism utilized by the web browsers and servers. This is used by Admin to download the custom 'hit' screens. The following is a list of methods and their definitions included in the Admin class implemented by the Admin applet. The listed methods are merely exemplary as there are more methods than described below.

Method Definitions public void process(TrsMsgMsg msg)
  This method will process a message buffer received from the Unison server.
  public boolean vini( )
  This method will establish a communication path to the WSAPI server for a browser
  public boolean logon(String name, String password)
  This method will log the agent into the Unison system with the name and the password.
  public void prompt(TrsMsgMsg msg)
  This method will process a received message that contains a prompt command.
  private void enable(TrsMsgMsg msg)
  This method will process the WSAPI enable command. This signifies whether an audio connection has been established with the Unison DSP. This command also contains the list of available campaigns that the agent is allowed to access.
  private void sendData(TrsMsgMsg msg)
  This method handles a send_data command from the WSAPI server. This functions somewhat differently than the typical WSAPI connection. The Admin accepts the command and performs the database lookup itself. The 'form' parameter is the name of an html page to be displayed in the 'data' window of the browser. The html page may have javascript wrapper functions to acquire database information from the Admin.
  private void removeData(TrsMsgMsg msg)
  This method will, indirectly, remove the data from the 'data' window of the browser. This message is usually received in response to a valid INPU command. All database, tac and user fields are removed at this time.
  private void tacField(TrsMsgMsg msg)
  This method will store tac field messages received by the WSAPI server. The field information can be obtained by the public getTacField( ) method.
  public String getTacField(String field)
  This method will retrieve the tac field value with the name field. If the field is unattainable a null is returned.
  public void setUserField(String name, String value)
  This method will set a user field. This field will persist until a removeData( ) method is received. The field can be retrieved with the getUserField( ) method.
  public void getUserField(String name)
  This method will retrieve the value of the user field with name. If the field cannot be obtained a null is returned.
  public boolean promptRespond(String text)
  This method will issue a prompt response to the WSAPI on behalf of the browser.
  public void campAdd(String camp)
  This method will issue an add_camp command to the WSAPI server. This will add the user as an agent available to receive calls from the Unison system.
  public void campAddResponse(TrsMsgMsg msg)
  The response to the add_camp command issued to the WSAPI server.
  public void avail( )
  This method is invoked to take an agent off of break.
  public void availResponse(TrsMsgMsg msg)
  The response to the avail command.
  public void unavail( )
  This command is issued to put the agent on break.
  public void unavailResponse(TrsMsgMsg msg)
  This method handles the response to the unavail request.
  private void dbReadRecord( )
  This method will read the Unison call record from the campaign database. The Camp class is used to store the retrieved information.
  public boolean setDBField(String field, String value)
  This method is used to update any database field in the call record. This method must be called to ensure the data gets written to the database prior to a promptRespond( ) method invocation.

Database Connectivity

Database connectivity is performed using jdbc. This class allows access to the Sybase dataserver. Since the browsers are still at JVM 1.0.2 this requires obtaining the jdbc class directly from Sybase. The jdbc and the Sybase drivers are required to communicate to the Sybase dataserver. The connectivity for the Admin is performed from the AdminSyb class. The AdminSyb class performs a connection to the Sybase dataserver which houses the campaign database. The AdminSyb also performs the database lookup and update for the Admin applet. Database reads are performed for every sendData( ) command and database updates are performed at every promptRespond( ) command.

WSAPI Differences

There are only two major points of difference with the WSAPI integration from Admin as opposed to a CLAPI integration. The first difference is in data presentation. The Admin is expecting the form to be an html page. The Admin will be responsible for passing the form data information on to the browser. The second major difference is that the Admin will manage database record integrity. The WSAPI will not be updating the database.

It should be noted that the Admin applet requires the Unison system to have a univtac with module was.c at was.c@@/main/uni2.1rel/4 or higher.

Also, the Admin applet requires a new version of WSAPI that handles trsmsg connections.
{Note: Delete Header.}

```
Class davox.admin.AdminApplet
[java.long.Object
    |
    +----java.awt.Component
        |
        +----java.awt.Container
            |
            +----java.awt.Panel
                |
                +----java.applet.Applet
                    |
                    +----davox.admin.Admin
                        |
                        +----davox.admin.AdminApplet
public class AdminApplet
extends Admin
implements ActionListener, AdminInterface]
```

The following are constructor and method indices and definitions for the "public class AdminApplet." These constructors and methods extend Admin to implement ActionListener and AdminInterface. These constructors and methods also provide the Java implementation of the admin bui panel, present agent controls and handle agent input events.

Constructor Index
    AdminApplet( )
Method Index
    actionPerformed(Object)
        Callback when one of the buttons in the admin applet is pressed.
    addCampCookie(String)
        Called when camps.html is first displayed.
    admAbortPrompt( )
        Abort a prompt and return agent back to call screen.
    admAbortTransfer( )
        Callback when cancel selected in confirm transfer prompt
    admAddCamp(String)
        Add a campaign to the agent's portfolio.
    admAvail( )
        Request to make agent available.
    admAvailResponse(int, String)
        Callback from Unison to agent "ready to recieve calls" request
    admCampAddResponse(int, String)
        Called by admin in response to a campaign being added.
    admCampRemoveResponse(int, String)
        Called by admin in response to a campaign being removed.
    admCampsResponse(int, String, String, String)
        Called by admin asynchronously after getCamps has been called.
    admCancelCamps( )
        Called when the "X" is selected in campaign selection page.
    admCancelPrompt( )
        Callback when X selected in extension.html.
    admConferenceTransfer(String)
        Called from JavaScript when a term code is selected.
    admConfirmTransfer( )
        Callback when check mark selected in confirm transfer prompt
    admConnectionLost( )
        Handles abnormal losing of connection to Unison server(s).
    admEnable(String)
        Agent is logged on and ready to recieve calls
    admExcludeResponse(int, String)
        Called by Admin when an EXCLUSION term code response has been processed.
    admGotoTab(String)
        Call via JavaScript from "logandgo.html" to change from the call tab to another tab.
    admLogoff( )
        Handles agent logoff request.
    admLogoffResponse( )
        Handles the logoff response from Unison.
    admLogon( )
        Presents the agent logon screen.
    admLogonResponse(int, String)
        Handles the logon response from Unison.
    admMessage(String)
        Handles messages (was_send_msg).
    admPopUp(String, int)
        Handles popup messages (was_popup).
    admProcessCamps( )
        Called when the check mark is selected in the campaign page.
    admProcessExclude(String, String, String)
        Called when check selected in exclude screen
    admProcessLogon(String, String)

-continued

Handles agent logon request.
admProcessPrompt(String)
    Callback when check selected in extension.html.
admProcessRecall(String)
    Callback when check mark selected in recall prompt.
admProcessSilentTransfer(String, String)
    Called from JavaScript to perform a transfer without prompting for a number.
admProcessTransfer(String)
    Callback when check mark selected in transfer prompt.
admPrompt(String, int)
    Handles prompt messages.
admPromptRespond(String)
    Called from JavaScript when a term code is selected.
admPromptRespondExclude( )
    Called from JavaScript when an EXCLUDE term code is selected.
admPromptRespondRecall(String)
    Called from JavaScript when a RECALL term code is selected.
admPromptRespondTransfer(String)
    Called from JavaScript when a TRANSFER term code is selected.
admRemoveCamp(String)
    Removes a campaign to the agent's portfolio.
admRemoveData( )
    Called by Unison to clear the hit screen and enter the "waiting for call" state.
admSendData(String)
    Called by Unison to display a hit screen.
admTacField(String, String)
    Called by Unison once for every TAC field associated with a new call.
admUnavailResponse(int, String)
    Callback from Unison to agent's break request.
busyOff( )
    Turn off the busy indicator
busyOn( )
    Turn on the busy indicator
clearTacStatus( )
    Clears the tac status frame.
getAgentMessages( )
    Return AgentMessages for formatting agent message page.
getAgentName( )
    Allows agent name to be retrieved from other Java applets or JavaScript.
getAgentPassword( )
    Allows agent password to be retrieved from other Java applets or JavaScript.
getAvailCamp( )
    Return the next available campaign.
getAvailCampCount( )
    Called from camps.html to begin the process of retrieving available campaigns.
getCampCookie( )
    Returns the list of selected campaigns for setting the campaigns cookie.
getExclusionData( )
    Return ExclusionData for formatting exclude prompt.
getJoinedCamp( )
    Return the next selected campaign.
getJoinedCampCount( )
    Called from camps.html to begin the process of retrieving selected campaigns.
getTacField( )
    Get a tac field.
getTacFieldCount( )
    Called from tac.html to retrieve the number of tac fields.
getTacStatus( )
    Called from tacstatus.html as a result of showTacStatus( ) being called.
getTransferMsg( )
    Returns text to be displayed in head of transfer.html.
handleEvent(Event)
    Handle mouse events on the button.
init( )
    Initialize the admin applet.
paint(Graphics)
    Paint the background graphic.
setStatsAvailable(boolean)
    Called by the stats collector applet when stats are available to be displayed.
showTacStatus(String)
    Displays the message in the tac status frame.
showUrl(String, String)
    Instructs the browser to show a html file in the specified frame.
update(Graphics)
    Override update to prevent flashing.
Constructor Definitions
    AdminApplet
        public AdminApplet( )
Method Definitions
    init
        public void init( )
            Initialize the admin applet. Creates the interface components and does a super.init( ) to let Admin.class do it's thing.
            Overrides:
                init in class Admin
    actionPerformed
        public void actionPerformed(Object obj)
            Callback when one of the buttons in the admin applet is pressed. Dispatches the event for processing. The switching of tabs is complicated because when we go from the call tab to any other tab we want the url of the current hit screen such that when the call tab is reselected we return the agent to that url and not the start of the script. To do this must go through JavaScript to get the url of the current hit screen. This is done by displaying the file "logandgo.html" in a non viewable frame. This file calls admGotoTab passing it the url of the current hit screen. Only when admGotoTab is called do we actually change tabs. The url of the current hit screen is saved for use if the call tab is reselected.
            Parameters:
                obj - The button which was pressed.
    admGotoTab
        public synchronized void admGotoTab(String url)
            Call via JavaScript from "logandgo.html" to change from the call tab to another tab. The route through JavaScript is used to allow the url of the current hit screen to be detected. Note, the termcode prompts have been also added as we know use logandgo as the route to display termcode prompts. This is such that if a termcode prompt is aborted we can return the agent to the correct url of the hit screen also.
            Parameters:
            url - Url of current hit screen.
    setStatsAvailable
        public void setStatsAvailable(boolean b)
            Called by the stats collector applet when stats are available to be displayed. We don't enable the stats tab until then.
    paint
        public void paint(Graphics g)
            Paint the background graphic. Note the PictureButtons extend Canvas. They recieve their own paint messages.
            Overrides:
                paint in class Container
    update
        public void update(Graphics g)
            Override update to prevent flashing.
            Overrides:
                update in class Component

```
handleEvent
    public boolean handleEvent(Event e)
        Handle mouse events on the button. If state of the
        button will be set according to the event and the
        button's current state. The event listener for this
        button may be called.
        Overrides:
            handleEvent in class Component
admSendData
    protected void admSendData(String urlString)
        Called by Unison to display a hit screen. We force
        the call tab to be visible.
        Parameters:
            url - Name of html file to be displayed.
        Overrides:
            admSendData in class Admin
admRemoveData
    protected void admRemoveData( )
        Called by Unison to clear the hit screen and enter
        the "waiting for call" state.
        Overrides:
            admRemoveData in class Admin
admTacField
    protected void admTacField(String tac_field,
                            String tac_value)
        Called by Unison once for every TAC field associated
        with a new call. Saves them away in tacFields. Note
        we save both the field and value names in the same
        vector.
        Parameters:
            tac_field - Field name.
            tav_value - Field value.
        Overrides:
            admTacField in class Admin
getTacFieldCount
    public synchronized int getTacFieldCount( )
        Called from tac.html to retrieve the number of tac
        fields. We return tac fields to JavaScript one at a
        time because in IE 3.0 we cannot return arrays to
        JavaScript. Note because we store tac fields in a
        single vector this is actually 2 * the number of tac
        fields.
getTacField
    public synchronized String getTacField( )
        Get a tac field. Note on alternating calls we return
        the name of the tac field then it's value.
admLogon
    public void admLogon( )
        Presents the agent logon screen.
admProcessLogon
    public void admProcessLogon(String uname,
                            String passwd)
        Handle agent logon request. Called by "check" button
        in logon page (logon.html). Note the prompting for
        agent extension (if any) is triggered by an
        asynchronous prompt callback message from the admin
        applet
        Parameters:
            uname - Username entered by agent
            passwd - password entered by agent
admLogonResponse
    protected void admLogonResponse(int statusCode,
                            String statusString)
        Handles the logon response from Unison. The only
        button we enable is logoff. The other buttons will
        be enabled when admEnable is called by Unison.
        Parameters:
            statusCode - ADM_SUCCESS or ADM_FAILURE
            statusString - If ADM_FAILURE, the reason for
                the failure.
        Overrides:
            admLogonResponse in class Admin
admLogoff
    protected void admLogoff( )
        Handle agent logoff request. Turns the logoff
        button's busy indicator on to let agent know a
        logoff is pending.
admLogoffResponse
    protected void admLogoffResponse( )
        Handles the logoff response from Unison.
        Parameters:
            statusCode - ADM_SUCCESS or ADM_FAILURE
            statusString - If ADM_FAILURE, the reason for
                the failure.
        Overrides:
            admLogoffResponse in class Admin
admConnectionLost
    protected void admConnectionLost( )
        Handle abnormal losing of connection to Unison
        server(s). When this occurs we display a "Connection
        lost..." message (in connectlost.html).
        Parameters:
            statusCode - Not used.
            statusString - Not used.
        Overrides:
            admConnectionLost in class Admin
admEnable
    protected void admEnable(String campaigns)
        Agent is logged on and ready to recieve calls
        Overrides:
            admEnable in class Admin
getAgentName
    public String getAgentName( )
        Allows agent name to be retrieved from other Java
        applets or JavaScript.
getAgentPassword
    public String getAgentPassword( )
        Allows agent password to be retrieved from other
        Java applets or JavaScript.
admUnavailResponse
    protected void admUnavailResponse(int code,
                            String status)
        Callback from Unison to agent's break request.
Class davox.admin.ShowUrl
[java.long.Object
    |
    +----java.lang.Thread
        |
        +----davox.admin.ShowUrl
public class ShowUrl
extends Thread
This class allows]
```

The following are field, constructor and method indices and definitions for the public class, "ShowUrl". These fields, constructors and methods extend threads to allow the admin applet to display URLs in the browser on a non JavaScript thread. IE 4.0 has a "bug" where when a call is made from JavaScript to a Java applet and the Java applet then calls showDocument, the showDocument takes 5 to 10 seconds to complete. By doing the showDocument on a new thread, and hence not on a JavaScript thread, we avoid this problem.

Field Index
    ac
    frame
    url
Constructor Index
    ShowUrl(AppletContext, URL, String)
        Constructor
Method Index
    run( )
        Displays the URL
Field Definitions
    ac
        protected AppletContext ac
    url
        protected URL url
    frame
        protected String frame
Constructor Definitions
    ShowUrl
        public ShowUrl(AppletContext ac,
                       URL url,
                       String frame)
            [Constructor]
Method Definitions
    run
        public void run( )
            Displays the URL
            Overrides:
                run in class Thread
{Note: Delete Footer.}
Class davox.admin.AdminLEDs
[java.long.Object
    |
    +----java.awt.Component
        |
        +----java.awt.Container
            |
            +----java.awt.Panel
                |
                +----davox.awt.LEDPanel
                    |
                    +----davox.admin.AdminLEDs
public class AdminLEDs
extends LEDPanl
Panel]

This class controls a panel of status lights (LEDs) used in admin for debugging. Two types of LEDs are used. TYPE 1: Track method calls. Green: Neutral (no action in progress). This is the default Yellow: Processing a method. An LED will go green when method complete. A Red LED indicates that an error occurred in a method. TYPE 2: Track boolean flags. Green: Flag is off. Yellow: Flag is on. Debug LED. For use in creating panels of LED for runtime debugging. An LED communicates it state by it's color. An LED can be one of four colors. GRAY: Off. GREEN: On. RED: Error. BLUE: On, after an error has previously occurred. The following are field, constructor and method indices and definitions for the public class, "AdminLEDs".

Field Index
    ACTPERF
    ADMEXCLUDER
    ADMPABORT
    ADMPRESPOND
    ADMPREXCLUDE
    ADMPROCEXCLUDE
    ADMPROCRECALL
    ADMPROCSTRANS
    ADMPROCTRANS
    ADMPRRECALL
    ADMPRTRANS
    BADPROMPT
    BADWASMSG
    MAX_LED
    REINIT
    SEP
    SHOWCGI -continued

```
        SHOWURL
        SYBCONN
        SYBOK
        SYBREAD
        SYBWRITE
        TABSENABLED
        TCENABLED
        WASCONN
        WASOK
        WASPROCMSG
        WASRECVMSG
        WASSENDMSG
Constructor Index
    AdminLEDS(Applet, Console)
        [Constructor]
Method Index
    handleEvent(Event)
        Detect mouse click of dump button
Field Definitions
    TCENABLED
        public final static int TCENABLED
    TABSENABLED
        public final static int TABSENABLED
    BADPROMPT
        public final static int BADPROMPT
    BADWASMSG
        public final static int BADWASMSG
    REINIT
        public final static int REINIT
    WASRECVMSG
        public final static int WASRECVMSG
    SYBOK
        public final static int SYBOK
    WASOK
        public final static int WASOK
    SEP
        public final static int SEP
    WASSENDMSG
        public final static int WASSENDMSG
    WASPROCMSG
        public final static int WASPROCMSG
    SYBREAD
        public final static int SYBREAD
    SYBWRITE
        public final static int SYBWRITE
    WASCONN
        public final static int WASCONN
    SYBCONN
        public final static int SYBCONN
    ADMPRESPOND
        public final static int ADMPRESPOND
    ADMPABORT
        public final static int ADMPABORT
    ADMPRRECALL
        public final static int ADMPRRECALL
    ADMPROCRECALL
        public final static int ADMPROCRECALL
    ADMPRTRANS
        public final static int ADMPRTRANS
    ADMPROCTRANS
        public final static int ADMPROCTRANS
    ADMPROCSTRANS
        public final static int ADMPROCSTRANS
    ADMPREXCLUDE
        public final static int ADMPREXCLUDE
    ADMPROCEXCLUDE
        public final static int ADMPROCEXCLUDE
    ADMEXCLUDER
        public final static int ADMEXCLUDER
    SHOWURL
        public final static int SHOWURL
    ACTPERF
        public final static int ACTPERF
    SHOWCGI
        public final static int SHOWCGI
    MAX_LED
        public final static int MAX_LED
Constructor Definitions
    AdminLEDs
```

-continued

```
                public AdminLEDS(Applet a,
                                Console c)
                        [Constructor]
Method Definitions
        handleEvent
                public boolean handleEvent(Event e)
                        Detect mouse click of dump button
                        Overrides:
                                handleEvent in class Component
{Note: Delete Footer.}
{Note: Delete Header.}
Class davox.host.DataSet
[java.long.Object
        |
        +----java.awt.Component
                |
                +----java.awt.Container
                        |
                        +----java.awt.Panel
                                |
                                +----java.applet.Applet
                                        |
                                        +----davox.host.HostCommon
                                                |
                                                +----davox.host.DataSet
public class DataSet
extends HostCommon
holds sata set
author malcom]
```

The public class host DataSet extends the public class HostCommon to hold data sets. The following are field, constructor and method indices and definitions for the public class, "DataSet".

```
Field Index
    DSHash
        stores by dataset name the dataset vectors.
Constructor Index
    DataSet( )
Method Index
    about( )
    getArray(String)
        returns vector as a Array this works on netscape's
        javascript
    getData(String)
        getData("zzz.5") - gets column 5 for the current row
        zzz.DS [currentrow*totcols + 5]
        getData("zzz. *;") - gets all columns for the current
        row, using chars following * (;) as column
        separator, will be in storage column order
        getData("zzz;") - gets entire Vector (except current
        row) columns;colnam1;colnam2...;data;data;; using last
        char (;) as column separator
        getData("zzz.5.*;") - gets column 5 for the all rows
        using chars following * (;) as column separator,
        getData("zzz.0") - gets current row number
    getVector(String)
        get a data set by passing the vector
    init( )
    row(String, String)
        row("zzz", "1") - sets current_row to 1
        row("zzz", ".") - no change, return current row
        row("zzz", "+") - sets the DS current row + 1
        row("zzz", "END") - sets the DS last row
        row("zzz.5", match) - sets the DS current row where
        col 5 match NOTE: this is the only row command with
        dotted tag "."
        row("zzz", "0") - sets current row to colname row
        if any modification is done to row 0 the entire DS
        is deleted
        row("zzz", "ADD") - adds a new row after current
        row
        row("zzz", "DEL") - deletes the current row
    setData(String, String)
```

-continued

```
            setData("zzz.5",v) - sets column 5 for the current
            row zzz.DS [currentrow*totcols + 5]
            setData("zzz.*;","v;v;v") - sets all columns for
            the current row using chars following * (;) as
            column separator, will be in storage column order
            setData("zzz;","n;col;v;v;v;") - sets entire Vector
            (except row position)
            columns;colnam1;colnam2...;data;data;[;]
            using last char (;) as column separator
            used to set from props file.
        setVector(String, Vector)
            install a data set by passing the vector
Field Definitions
    DSHash
        public Hashtable DSHash
            stores by dataset name the dataset vectors.
            dataset names cannot include any dot "." chars.
            column names cannot include ".*"
            column names cannot start with "*"
            column names cannot be the string "0"
Constructor Definitions
    DataSet
        public DataSet( )
Method Definitions
    row
        public int row(String name,
                   String cmd)
            row("zzz", "1") - sets current_row to 1
            row("zzz", ".") - no change, return current row
            row("zzz", "+") - sets the DS current row + 1
            row("zzz", "END") - sets the DS last row
            row("zzz.5", match) - sets the DS current row where
            col 5 match NOTE: this is the only row command with
            dotted tag "."
            row("zzz", "0") - sets current_row to colname row
            if any modification is done to row 0 the entire DS
            is deleted
            row("zzz", "ADD") - adds a new row after current
            row
                row("zzz", "DEL") - deletes the current row
    setData
        public void setData(String name,
                        String value)
            setData("zzz.5",v) - sets column 5 for the current
            row zzz.DS [currentrow*totcols + 5]
            setData("zzz.*;", "v;v;v") - sets all columns for
            the current row using chars following * (;) as
            column separator, will be in storage column order
            setData("zzz;","n;col;v;v;v;") - sets entire Vector
            (except row position)
            columns;colnam1;colnam2...;data;data; using last
            char (;) as column separator used to set from props
            file. deletes old DS, and after loaded sets row to
            END
            setData("zzz*", "ds2") - sets entire Vector
            (including row position) as a duplicate of dataset
            ds2.
            NOTE: setData commands without a dot ".", clear the
            entire DS
    getData
        public String getData(String name)
            getData("zzz.5") - gets column 5 for the current
            row zzz.DS [currentrow*totcols + 5]
            getData("zzz.*;") - gets all columns for the
            current row, using chars following * (;) as column
            separator, will be in storage column order
            getData("zzz;") - gets entire Vector (except
            current row)
            columns;colnam1;colnam2...;data;data;[;] using last
            char (;) as column separator,
            getData("zzz.5.*;") - gets column 5 for the all
            rows using chars following * (;) as column
            separator,
            getData("zzz.0") - gets current row number
    getVector
        public Vector getVector(String name)
            get a data set by passing the vector
            Overrides:
                getVector in class HostCommon
```

-continued

```
setVector
    public void setVector(String name,
                          Vector DS)
        install a data set by passing the vector
        Overrides:
            setVector in class HostCommon
getArray
    public String[ ] getArray(String name)
        returns vector as a Array this works on netscape's
    javascript
init
    public void init( )
        Overrides:
            init in class HostCommon
about
    public String about( )
{Note: Delete Footer.}
[DateSet table zzz
match count+0
(above should be a java script table)]
DataSet test
-- click for stats in console
result
name (zzz) or element (zzz.age) ARG1:
new command or set value ARG2:
Be sure to set both ARG1 and ARG2 before clicking either button
below:
-- click this first to set zzz dataset with value shown
various HostConn applets using DataSets]
DataSet (DS) for java/BUI spec
javadoc for DataSet.class
    DS.row (tag,cmd) has 8 variations, and does most of the mgmt
        row returns current row or 0 if empty, nomatch, or past
            end
    getData (tag) has 3 variations, returning string lists
    setData (tag,string) has 3 variations
        note: row numbers and column numbers start at 1
    row("zzz", "1") - sets current row to first row
    row("zzz", ".") - no change, return current row
    row("zzz", "+") - sets the DS current row + 1
    row("zzz", "END") - sets the DS last row
    row("zzz.5", match) - sets the DS current row where col 5
        match
    row("zzz", "0") - sets currentrow to colname row
        if any modification is done to row 0 the entire DS is
        deleted
    row("zzz", "ADD") - adds a new row after current row
    row("zzz", "DEL") - deletes the current row
    g/setData("zzz.5") - gets or sets column 5 for the current
        row zzz.DS [currentrow*totcols + 5]
    g/setData("zzz.*;") - gets or sets all columns for the
        current row chars after * (;) as column separator will be
        in storage column order
    g/setData("zzz,") - sets or gets entire Vector (cols, names,
        data)
        columns,colnam1,colnam2...,data,data,, used to set from
        props file.
        deletes old DS, and after loaded sets row (,"END")
        NOTE: only get/set command without a "." last char is
        separator.
    setData ("zzz*","yyy") - sets entire Vector as a copy of DS
        yyy
    getData ("zzz.5.*,") - gets column 5 for the all rows
    getData ("zzz.0") - gets current row number
    g/setVector (zzz) - for interapplet comm, passes dataset
        Vector.  see DSVector layout
    colnames
        note wherever 5 is used above the colname will be allowed
        column names cannot include "*" char
        column names cannot be the string "0"
        screen logic must sort the row lists into/from storage
        order.
            row ("zzz", "0"); getData ("zzz.*,") will display colnames
    DSHash zzz
        holds data as DS vector
    DSVector layout:
        String Vector[2+cols+rows*cols]
        in the following order:
            row;totcols;colname1;colname2;...;row1col1;
```

-continued

```
                rowlc2;..;row2cl;
            row numbers and column numbers start at 1
            index 0 holds the current row (initialized to last
                row). last row = ((Vector.size − 2) / cols)−1
            index 1 holds the number of columns per row
            row 0 holds the names of the columns using a single
            dimensional vector (the first 2 fields passing the
            dimension) allows the JDBC applets to pass multiple
            result sets in one vector. The HostConn applet will
            split the result sets into multiple data sets before
            posting them with the DataSet applet, but otherwise
            does little else.
SCRIPT+ dataset functions compared
    INIT name, field, ... WITH query
        HOST.getData (name)
    INIT name, field,... AS value,value
        DS.setData ("name;") columns;colnames;..;data;...
    ADDROW name field,... = value,value
        DS.row (name, "ADD")
        DS.setData ("zzz.*," "rowvalue,value,value")
    FOREACH name
        DS.row (name, "1")
    ENDFOR name
        DS.row (name, "+")
    FINDROW name field = value
        DS.row ("zzz.5", value)
    DELETEROW name
        DS.row (name, "DEL")
HostConn (HOST) applet changes to support DS applet
    Props.host has the same format except a flag in the
applet/dbserver property (x) will indicate if that class of data
will be stored in the DS applet:
    Props.host x=HOSTapplet;DS;server;password;..host specific
        The load properties are the same, but a "x.y.*" property
        will be looked for instead of an "x.y.z" property.
        One of the 3 optional load properties otherwise is loads
            a single column DS:
                with select z from y
    Props.host x.y=0;table where
    props.host x.y.*= 2;columns,colnam1,colnam2...,data,data,,
    Props.host x.y.*= 0;query
    Props.host x.y.*.update= update query
        with DS property,
        nothing is cached locally because x.y.z differs
        based on current row
        however LocalData will hold update info
            x.y.* = state;
            x.y.*.QV = last query
HostConn additions:
    on HOST.getData x.y.z for DS marked x
        if x.y.* is empty, HOST will load DS with setData
        ("y,",data) if the Props.host file has DS data,
        otherwise will request a Vector from JDBC applet
        and load DS with setVector( ).
            will call Host execute putting result in a Vector
            NOTE will check to see if the Vector contains
                multiple result sets.
            will call DS.setVector("x:y",)
            or if multiple result sets saves each DS
            will call DS.setVector("x:y1",)
            will call DS.setVector("x:y2",)
        otherwise once DS is indicated as loaded,
        will call DS applet with getData("x:y.z")
        for non host loaded datasets,
        screenlogic can call DS applet directly
        DS.row selection is always done directly on DS applet
other support functions:
    updateData(x.y.*) - will update entire DataSet,
        even if no known Changes
    changeData(x.y.*) - will tell if known changes
    Due to the complexity of DS x.y.*.update
    hostconn will support variable
    DS(name) substituted with DS.getData(name)
    and loop operator
|NEW|   DSFOR(sep){ .. }
    substituted by doing the loop while substituting DS( ) vars in
    ..;
|NEW|   row("name","0") while row("name","+"){if(row>1){sep}{..} else
    {..} }
```

-continued

```
    DSFOR( ) will not be nestable nor sequence more than one
    DataSet. So the Dataset must include in its rows, all it needs
    for the updates. Of course user U( ) and davox D( ) fields can
    be referenced as will as the current row of other DataSets.
sql query command building issues HostConn Wizard:
    two general classes of host queries:
        1. entire rows pulled : select * from table where ..
            this can be updated with:
            delete from table where ..
            insert table values( )
|NEW|   values('DS(zzz.*',')')
            would return: values('data','data')
            useful if row is all char types.
|NEW|   DSFOR(,){ values('DS(zzz.1)',DS(zzz.2))}
            would return:
            values('data',0data), values('data',0data)
        2. specific columns : select a,b from table where ..
            in this case the ds cannot grow or shrink
            if returns a single row: this can be updated with:
                update table set a = v, set b = v where ..
                set a = 'DS(zzz.1)', b = DS(zzz.2)
                would return: set a = 'data', b = 0data
            if multiple rows, some column must be included which can
            uniquely id a row, and its old value saved:
                update table set a = v, set b = v where b == oldv
                and ..
                in this case oldv must be stored in same dataset
{Note: Delete Header.}
Class davox.host.HostConn
[java.long.Object
    |
    +----java.awt.Component
        |
        +----java.awt.Container
            |
            +----java.awt.Panel
                |
                +----java.applet.Applet
                    |
                    +----davox.host.HostCommon
                        |
                        +----davox.host.DataConn
public class HostConn
extends HostCommon
hostconn - dispatch applet.   all]
```

The public class "HostConn" extends HostCommon. It is a dispatch applet. All HostData requests come through this applet and are mapped by strings in Props.host file and dispatched to the appropriate hostconn applet local copies of all data are cached here in LocalData author malcom version 1.16 10/21/97. The following are field, constructor and method indices and definitions for the public class, "HostConn".

```
Field Index
    CHANGED
        state 4;
    LIVE
        state 1;
    LOADED
        state 2;
    LocalData
        cached data
    pH
        Props.host contents
    propsPath
        if set, used as path +/props.host and +/file.csv
        if not set defaults to Props.host and forms/maps/file.csv
    QVAR
        x.y.z.Qv holds the expanded query
    UPDATED
        state 3;
Constructor Index
    HostConn( )
```

-continued

Method Index
    changedHostData(String)
        x.[y.[z]] will find all matching localData Host fields
        (stored in the hashtable), returning the count of CHANGED
        fields
    clearHostData(String)
        x.[y.[z]] will find all matching localData Host fields
        (stored in the hashtable) and delete them, returning the
        count of CHANGED fields cleared or -number of ERROR
        fields cleared
    DSmacro(String)
        processes a macro
        DS(ds...) DS(name) substituted by DS.getData(name)
        DSROW(ds...
    getData(String)
        always fetches from host is Props.host tag entry is LIVE
        (1;) otherwise gets local cached copy of data if there,
        if no loaded cached copy: if Props.host tag entry is
        LOADED (2;) initializes to that data, (separated by
        comma, if a list) otherwise fetching from host applet.
    init( )
    setData(String, String)
        this sets local copy of host data values (like Admin does
        for Davox) setting state info as well if Prop: x=;DS;
        will set DS x:y.z or just updates host if Props.host tag
        entry is LIVE (1;) and there exists a Props.host
        tag.update command
        D(davoxDB) U(User) and VF(value arg) will be substituted
    updateHostData(String)
        x.[y.[z]] will find all CHANGED matching Host fields and
        update them, returning a count of updates if all OK or -
        number of failures if any failed
        if available will use Props.host x.y.z.update command
        otherwise will use update y set z = VF( ) OR if x.y Prop:
        update x.y set z = VF( )
Field Definitions
    pH
        public Properties pH
            Props.host contents
    propsPath
        public String propsPath
            if set, used as path +/props.host and +/file.csv
            if not set defaults to Props.host and
                ../forms/maps/file.csv
    LocalData
        public Hashtable LocalData
            cached data
    LIVE
        public final int LIVE
            state 1;
    LOADED
        public final int LOADED
            state 2;
    UPDATED
        public final int UPDATED
            state 3;
    CHANGED
        public final int CHANGED
            state 4;
    QVAR
        public final String QVAR
            x.y.z.Qv holds the expanded query
Constructor Definitions
    HostConn
        public HostConn( )
Method Definitions
    updateHostData
        public int updateHostData(String tag)
            x.[y.[z]] will find all CHANGED matching Host fields
            and update them, returning a count of updates if all
            OK or -number of failures if any failed
            if available will use Props.host x.y.z.update
            command otherwise will use update y set z = VF( )OR
            if x.y Prop: update x.y set z = VF( )
    clearHostData
        public int clearHostData(String tag)
            x.[y.[z]] will find all matching localData Host
            fields (stored in the hashtable) and delete them,
            returning the count of CHANGED fields cleared or -

```
                    number of ERROR fields cleared
    changedHostData
        public int changedHostData(String tag)
            x.[y.[z]] will find all matching localData Host
            fields (stored in the hashtable), returning the
            count of CHANGED fields
    getData
        public String getData(String tag)
            always fetches from host is Props.host tag entry is
            LIVE (1;) otherwise gets local cached copy of data
            if there,
            if no loaded cached copy:
            if Props.host tag entry is LOADED (2;) initializes
            to that data, (separated by comma, if a list)
            otherwise fetching from host applet. if available
            will use Props.host tag query command, otherwise
            will use: select z from y OR if x.y Prop: select z
            from x.y
            D(davoxDB) U(User) will be substituted
            if Prop: x=;DS; will then return DS x:y.z but if
            Props.host tag x.y.z is set, it is used as MACRO to
            format DS data or pull an entire comma, separated
            list.
    setData
        public void setData(String tag,
                            String value)
            this sets local copy of host data values (like Admin
            does for Davox) setting state info as well if Prop:
            x=;DS; will set DS x:y.z,
            or just updates host it Props.host tag entry is LIVE
            (1;) and there exists a Props.host tag.update
            command
            D(davoxDB) U(User) and VF(value arg) will be
            substituted
    DSmacro
        public String Dsmacro(String s)
            processes a macro
            DS(ds...) DS(name) substituted by DS.getData(name)
            DSROW(ds... val) and incrementor and logic:
            DSROW(ds.col match) does DS.row(ds.col,match) and
            DSROW(ds +) does DS.row(ds,"+") if DSROW( ) fails
            (returns 0), macro is stopped at that point and
            returns string up to that point.
            DSFOR(sep) {....} and loop operator substituted by
            doing the loop while substituting DS( ) vars in ..:
            row(ds,"0") while row(ds,"+") { data(sep)data.. }
            DSIF(col == match) .. checks string col == match
            DSIF(col != match) .. checks string col != match
            DSIF(col > match) .. checks numeric col > match
            DSIF(col < match) .. checks numeric col < match if
            any DSIF( ) fails, the next loop of the DSFOR is
            tried, if not in a DSFOR the macro is stopped at
            that point and returns string up to that point.
    init
        public void init( )
            Overrides:
                init in class HostCommon
{Note: Delete Header.}
Class davox.host.JDBCsybase
[java.long.Object
    |
    +----java.awt.Component
            |
            +----java.awt.Container
                    |
                    +----java.awt.Panel
                            |
                            +----java.applet.Applet
                                    |
                                    +----davox.host.HostCommon
                                            |
                                            +----davox.host.JDBCsybase
public class JDBCsybase
extends HostCommon
implements Runnable
hostconn - any jdbc (Sybase,oracle,...) applet
author malcom]
```

The public class "JDBCsybase" extends HostCommon to implement Runnable. The following are field, constructor and method indices and definitions for the public class, "JDBCsybase".

```
Field Index
    __driver
        example __driver __server __user for sybase:
        com.sybase.jdbc.SybDriver jdbc:sybase:Tds:getHost:2025
            xxxcfg__user
        example __driver __server __user for oracle:
        oracle.jdbc.driver.OracleDriver jdbc:oracle:thin:
    __passwd
    __server
    __user
    Columns
    numColumns
    numRows
Constructor Index
    JDBCsybase( )
Method Index
    disconnect( )
        close the connection
    init( )
    query( )
    reconnect( )
        open - connection to __server, using __user __passwd sets
        Status and color
    run( )
    runQuery( )
        do the sql Query command sets Result and Columns using
        separator sep if Query startswith "[" will store the
        result as a DataSet [d:s select * from ...
    start( )
        for beaning - put image setup in start
    stop( )
        stop any background threads and close the connection
    ycqry( )
        old name - deprecated
    ycqryjob( )
        spawn the query in the background
    ycqrywait(long)
Field Definitions
    Columns
        public String Columns
    __user
        public String __user
    __passwd
        public String __passwd
    __driver
        public String __driver
            example __driver __server __user for sybase:
            com.sybase.jdbc.SybDriver
            jdbc:sybase:Tds:getHost:2025 xxxcfg__user
            example __driver __server __user for oracle:
            oracle.jdbc.driver.OracleDriver
            jdbc:oracle:thin:@getHost:1521:test sys
    __server
        public String __server
    numRows
        public int numRows
    numColumns
        public int numColumns
Constructor Definitions
    JDBCsybase
        public JDBCsybase( )
Method Definitions
    ycqryjob
        public void ycqryjob( )
            spawn the query in the background
    ycqrywait
        public void ycqrywait(long msec)
    run
        public void run( )
    reconnect
        public void reconnect( )
            open - connection to __server, using __user __passwd
            sets Status and color
    ycqry
        public void ycqry( )
```

```
        old name - deprecated
query
    public void query( )
runQuery
    public void runQuery( )
        do the sql Query command sets Result and Columns
        using separator sep
        if Query startswith "[" will store the result as a
        DataSet
        [d:s select * from ... if successful will call
        DS.setVector("d:s",) and if multiple result sets
        returned, following result sets are stored as:
        d:s:2, d:s:3,
        ['d:s select * from ... will wrap char type data
        with tick's ('value') useful for writing automatic
        commands.
        optionally sets _driver _server _user _passwd if
        passed in Result
        driver must contain . AND server must contain : AND
        Result must have at least 2 args ( note:
        getAgentName and/or getAgentPassword will already
        have been substituted by HostConn )
        Overrides:
            runQuery in class HostCommon
init
    public void init( )
        Overrides:
            init in class HostCommon
start
    public void start( )
        for beaning - put image setup in start
        Overrides:
            start in class HostCommon
disconnect
    public void disconnect( )
        close the connection
stop
    public void stop( )
        stop any background threads and close the connection
        Overrides:
            stop in class Applet
{Note: Delete Footer.}
{Note: Delete Header.}
Class davox.host.SCREENsbplug
[java.long.Object
    |
    +----java.awt.Component
        |
        +----java.awt.Container
            |
            +----java.awt.Panel
                |
                +----java.applet.Applet
                    |
                    +----davox.host.HostCommon
                        |
                        +----davox.host.SCREENsbplug
public class SCREENsbplug
extends HostCommon
SCREENsbplug - screen scraper SmartButton Clue version -via netscape
plugin
autho malcom]
```

The public class SCREENsbplug also extends HostCommon and provides a screen scraper SmartButton Glue version—via a netscape plugin. The following are field, constructor and method indices and definitions for the public class, "SCREENsbplug".

```
Field Index
    _link
    _server
        current connection
    Session
        cached connections
    SessionPkg
    un_link
Constructor Index
    SCREENsbplug( )
Method Index
    dropLinks(boolean)
    runQuery( )
        do the Query command
```

-continued

```
        STATUS
        SEND data
        SCREEN row col len
        DISCONNECT
        DELAY T, secs mat1,mat2,mat3
        select row_col_len from ;senddata
        select 0 from T, secs mat1,mat2,mat3;senddata
        select row_col_len from GO(3 1 1) T, s xx,x;data1;;data3
        sep; used to sep DELAY;SEND;...
    stop( )
Field Definitions
    _server
        public String _server
            current connection
    _link
        public int _link
    un_link
        public int un_link
    Session
        public String Session[ ]
            cached connections
    SessionPkg
        public String SessionPkg[ ]
Constructor Definitions
    SCREENsbplug
        public SCREENsbplug( )
Method Definitions
    runQuery
        public void runQuery( )
            do the Query command
            STATUS
            SEND data
            SCREEN row col len
            DISCONNECT
            DELAY T, secs mat1,mat2,mat3
```

-continued

```
            select row_col_len from ;senddata
            select 0 from T, secs mat1,mat2,mat3;senddata
            select row_col_len from GO(3 1 1) T,
            sxx,x;data1;;data3
            sep; used to sep DELAY;SEND;...
            Overrides:
                runQuery in class HostCommon
    dropLinks
        public void dropLinks(boolean disc)
    stop
        public void stop( )
            Overrides:
                stop in class Applet
{Note: Delete Footer.}
{Note: Delete Header.}
Class davox.stat.JustStats
[java.long.Object
    |
    +----java.awt.Component
            |
            +----java.awt.Container
                    |
                    +----java.awt.Panel
                            |
                            +----java.applet.Applet
                                    |
                                    +----davox.stat.JustStats
public class JustStats
extends Applet
The]
```

The public class "JustStats" extends an Applet and displays the display portion of the Statistics applet without the threads. The following are field, constructor and method indices and definitions for the public class, "JustStats".

```
Field Index
    db
Constructor Index
    JustStats( )
Method Index
    init( )
    start( )
    sts_GetAgentID( )
        Method: sts_GetAgentID( ) Descr: Returns the present
        setting of the Stats internal Agent ID.
    sts_GetAgentName( )
        Method: sts_GetAgentName( ) Descr: Returns to the caller
        the String that is the presently defined Agent name.
    sts_GetApplication(int)
        Method: sts_GetApplication(int index) Descr: Returns an
        AgentStatElements object reference for the input indexed
        element in the Application Stats Vector.
    sts_GetCampaign(int)
        Method: sts_GetCampaign(int index) Descr: Returns an
        AgentStatElements object reference for the input indexed
        element in the Campaign Stats Vector.
    sts_GetCompCampaign(int)
        Method: sts_GetCompCampaign(int index) Descr: Returns an
        AgentStatElements object reference for the input indexed
        element in the Comparative Stats Vector.
    sts_GetNumApplications( )
        Method: sts_GetNumApplications( ) Descr: Returns the
        number of applications presently available for the status
        display window, 0 if none are available.
    sts_GetNumCampaigns( )
        Method: sts_GetNumCampaigns( ) Descr: Returns the number
        of campaigns presently available for the status display
        window, 0 if none are available.
    sts_GetTermCodeDef(int, String)
        Method: sts_GetTermCodeDef(int app_id, String code)
        Descr: Returns a TermCodeElements object reference when
        the input app_id AND code are matched in the
```

-continued

```
        tcDefinitions vector.
    sts_IsServerAvailable( )
        Method: sts_IsServerAvailable( ) Descr: Returns true to
        the caller if the Stats server is available and logged in
        to (real stats are being collected) or false if the
        server is not available (real stats cannot be collected).
    sts_SetAgentID(int)
        Method: sts_SetAgentID(int id) Descr: Takes as input an
        int that is the presently logged on Agent ID.
    sts_SetAgentName(String)
        Method: sts_SetAgentName(String s) Descr: Takes as input
        a String that is the presently logged on Agent name.
    sts_StartStatistics( )
        Method: sts_StartStatistics( ) Descr: Get Term Code
        information and then spawns the DisplayStats popup window
        for data display.
    sts_StopStatistics( )
        Method: sts_StopStatistics( ) Descr: Called before the
        Statistics object is destroyed, calls the Statistics
        applet's stop( ) method which will stop the TrsMsg receive
        and data collection threads, then log out from the Stats
        (STS) server then destroys the Stats display window if it
        exists.
    sts_UpdateTime(int)
        Method: sts_UpdateTime(int seconds) Descr: If the Display
        Window is active, takes the input time value (in seconds)
        and updates the time display.
Field Definitions
    db
        public boolean db
Constructor Definitions
    JustStats
        public JustStats( )
Method Definitions
    init
        public void init( )
        Overrides:
            init in class Applet
    start
        public void start( )
        Overrides:
            start in class Applet
    sts_StartStatistics
        public void sts_StartStatistics( )
            Method: sts_StartStatistics( ) Descr: Get Term Code
            information and then spawns the DisplayStats popup
            window for data display. It will then try to connect
            to the Stats Server (STS). If successful, it then
            starts the STSRecv thread for receiving TrsMsgs from
            the server and spawns the thread to retrieve data
            from the server.
                Inputs: None
                Outputs: None
    sts_StopStatistics
        public void sts_StopStatistics( )
            Method: sts_StopStatistics( ) Descr: Called before
            the Statistics object is destroyed, calls the
            Statistics applet's stop( ) method which will stop
            the TrsMsg receive and data collection threads, then
            log out from the Stats (STS) server then destroys
            the Stats display window if it exists.
                Inputs: None
                Outputs: None
    sts_IsServerAvailable
        public boolean sts_IsServerAvailable( )
            Method: sts_IsServerAvailable( ) Descr: Returns true
            to the caller if the Stats server is available and
            logged in to (real stats are being collected) or
            false if the server is not available (real stats
            cannot be collected).
                Inputs: None
                Outputs: returns true if STS server available
                false if STS server not available
    sts_SetAgentID
        public void sts_SetAgentID(int id)
            Method: sts_SetAgentID(int id) Descr: Takes as input
            an int that is the presently logged on Agent ID.
                Inputs: int containing Agent ID
                Outputs: None
```

-continued

```
sts_GetAgentID
    public int sts_GetAgentID( )
        Method: sts_GetAgentID( ) Descr: Returns the present
        setting of the Stats internal Agent ID.
            Inputs: None
            Outputs: int containing Agent ID
sts_SetAgentName
    public void sts_SetAgentName(String s)
        Method: sts_SetAgentName(String s) Descr: Takes as
        input a String that is the presently logged on Agent
        name.
            Inputs: String Object containing Agent Name
            Outputs: None
sts_GetAgentName
    public String sts_GetAgentName( )
        Method: sts_GetAgentName( ) Descr: Returns to the
        caller the String that is the presently defined
        Agent name. This is presently set by the STS server
        and will be null otherwise. Thus if no STS server
        connection has been made, the name will be null.
            Inputs: None
            Outputs: returns Agent name string if STS
        server available null otherwise
sts_GetNumApplications
    public int sts_GetNumApplications( )
        Method: sts_GetNumApplications( ) Descr: Returns the
        number of applications presently available for the
        status display window, 0 if none are available.
            Inputs: None
            Outputs: Number of applications.
sts_GetNumCampaigns
    public int sts_GetNumCampaigns( )
        Method: sts_GetNumCampaigns( ) Descr: Returns the
        number of campaigns presently available for the
        status display window, 0 if none are available.
            Inputs: None
            Outputs: Number of campaigns.
sts_UpdateTime
    public void sts_UpdateTime(int seconds)
        Method: sts_UpdateTime(int seconds) Descr: If the
        Diplay Window is active, takes the input time value
        (in seconds) and updates the time display. This is
        used to show time between data fetches.
            Inputs: None
            Outputs: Number of campaigns.
sts_GetApplication
    public AgentStatElements sts_GetApplication(int index)
        Method: sts_GetApplication(int index) Descr: Returns
        an AgentStatElements object reference for the input
        indexed element in the Application Stats Vector.
        Will return null for an invalid index or if no data
        is available in the Application Stats Vector.
            Inputs: index of the vector element to return
            Outputs: AgentStatElements object reference
sts_GetCampaign
    public AgentStatElements sts_GetCampaign(int index)
        Method: sts_GetCampaign(int index) Descr: Returns an
        AgentStatElements object reference for the input
        indexed element in the Campaign Stats Vector. Will
        return null for an invalid index or if no data is
        available in the Campaign Stats Vector.
            Inputs: index of the vector element to return
            Outputs: AgentStatElements object reference
sts_GetCompCampaign
    public AgentStatElements sts_GetCompCampaign(int index)
        Method: sts_GetCompCampaign(int index) Descr:
        Returns an AgentStatElements object reference for
        the input indexed element in the Comparative Stats
        Vector. Will return null for an invalid index or if
        no data is available in the Comparative Stats
        Vector.
            Inputs: index of the vector element to return
            Outputs: AgentStatElements object reference
sts_GetTermCodeDef
    public TermCodeElements sts_GetTermCodeDef(int app_id,
                                               String code)
        Method: sts_GetTermCodeDef(int app_id, String code)
        Descr: Returns a TermCodeElements object reference
        when the input app_id AND code are matched in the
```

```
                        tcDefinitions vector. Will return null for no
                        match.
                              Inputs: int app_id = application id for Term
                              Code String code = the Term Code's code value
                              Outputs: TermCodeElements reference or null if
                              no match
{Note: Delete Header.}
{Note: Delete Footer.}
    Class davox.stat.StatsCollector
[java.long.Object
      |
      +----java.awt.Component
            |
            +----java.awt.Container
                  |
                  +----java.awt.Panel
                        |
                        +----java.applet.Applet
                              |
                              +----davox.stat.StatsCollector
public class StatsCollector
extends Applet
Collects]
```

The public class StatsCollector also extends an applet. It is used to collect statistics used by the statistics display applet(s). An instance of StatsCollector runs in the Admin frame as long as the Admin frame is open. Statistics are collected at a 10-minute interval unless set to another value as a parameter in applet tag:

<PARAM NAME="FREQUENCY" VALUE="4">

To turn on debug messages (if not using properties file for this purpose):

<PARAM NAME="DEBUG" VALUE="ON">

To specify a properties file:

<PARAM NAME="PROPERTIES" VALUE="[filename]">

In the properties file, to override default SysConfigPort (2025):

SYS_CNFG_PORT=[port]

In the properties file, to turn on debug messages:

STATS_DEBUG=1

The following are field, constructor and method indices and definitions for the public class, "StatsCollector".

```
Field Index
    bDemo
    bStatsServerAvail
    db
    FETCH_APPS
    FETCH_CONNECTS
    FETCH_CONTACTS
    FETCH_DONE
    FETCH_NAME
    FETCH_NONE
    FETCH_TCODES
    FETCH_TIME
    fetchState
    fetchTime
    p
```

```
                         -continued props
    RECV_APPS
    RECV_CONNECTS
    RECV_CONTACTS
    RECV_NAME
    RECV_TCODES
    RECV_TIME
    statsAvail
    updateNow
Constructor Index
    StatsCollector( )
Method Index
    connectToStatsServer( )
        Method: connectToStatsServer( ) Descr: Attempts to hook up
        to the Stats (STS) Server.
    destroy( )
        Destroy method.
    fetchStats( )
        Get Agent Stats from server.
    init( )
        process(TrsMsgMsg)
            Takes a TrsMsgMsg received from the STS server and calls
            the correct processing routine based on the fetchState
            flag.
    resetAllVectors( )
        Method: resetAllVectors( ) Descr: Resets all Stats Vectors
        to empty, if they are not already empty.
    resetStatVectors( )
        Method: resetStatVectors( ) Descr: Resets presently active
        Stats Vectors to empty, if they are not already empty.
    restartStatistics( )
        Method: restartStatistics( ) Descr: Called when an
        unexpected logout from the STS Server occurs.
    endAgentAppsAndCamps( )
        Sends a query to the STS server to obtain all Campaigns
        and Applications for the agent at this workstation.
    sendAgentContacts( )
        Method: sendAgentContacts( ) Descr: Sends a query to the
        STS server to obtain the number of contacts for all the
        agents associated with this agent's Campaigns.
    sendAgentName( )
        Sends a query to the STS server to obtain all Agent names
        so that a match may be found for the input agent name.
    sendAgentTermCodes( )
        Method: sendAgentTermCodes( ) Descr: Sends a query to the
        STS server to obtain all Term Codes and Term Code numbers
        for the agent for their applications and campaigns.
    sendAgentTime( )
        Method: sendAgentTime( ) Descr: Sends a query to the STS
```

```
        server to obtain the active times for all the agents
        associated with this agent's Campaigns.
    start( )
        Method: start( ) Descr: Creates but does not display the
        DisplayStats popup window.
    stop( )
    sts_GetAgentID( )
        Method: sts_GetAgentID( ) Descr: Returns the present
        setting of the Stats internal Agent ID.
    sts_GetAgentName( )
        Method: sts_GetAgentName( ) Descr: Returns to the caller
        the String that is the presently defined Agent name.
    sts_GetApplication(int)
        Method: sts_GetApplication(int index) Descr: Returns an
        AgentStatElements object reference for the input indexed
        element in the Application Stats Vector.
    sts_GetCampaign(int)
        Method: sts_GetCampaign(int index) Descr: Returns an
        AgentStatElements object reference for the input indexed
        element in the Campaign Stats Vector.
    sts_GetCompCampaign(int)
        Method: sts_GetCompCampaign(int index) Descr: Returns an
        AgentStatElements object reference for the input indexed
        element in the Comparative Stats Vector.
    sts_GetNumApplications( )
        Get number of available applications.
    sts_GetNumCampaigns( )
        Get number of available campaigns.
    sts_GetTermCodeDef(int, String)
        Method: sts_GetTermCodeDef(int app_id, String code)
        Descr: Returns a TermCodeElements object reference when
        the input app_id AND code are matched in the
        tcDefinitions vector.
    sts_IsServerAvailable( )
        Method: sts_IsServerAvailable( ) Descr: Returns true to
        the caller if the Stats server is available and logged in
        to (real stats are being collected) or false if the
        server is not available (real stats cannot be collected).
    sts_SetAgentID(int)
        Method: sts_SetAgentID(int id) Descr: Takes as input an
        int that is the presently logged on Agent ID.
    sts_SetAgentName(String)
        Method: sts_SetAgentName(String s) Descr: Takes as input
        a String that is the presently logged on Agent name.
    sts_SetFrequency(int)
        Method: sts_SetFrequency(int frq) Descr: Takes as input
        an integer value that will be the data collection
        frequency (in minutes).
    sts_ShowStatistics(boolean)
        Method: sts_ShowStatistics(boolean b) Descr: If the Stats
        window is not null, will show or hide the window
        depending on the value of the input parameter.
    sts_StartStatistics( )
        Method: sts_StartStatistics( ) Descr: Get Term Code
        information and then it will then try to connect to the
        Stats Server (STS).
    sts_StopStatistics( )
        Method: sts_StopStatistics( ) Descr: Called before the
        Statistics object is destroyed, calls the Statistics
        applet's stop( ) method which will stop the TrsMsg receive
        and data collection threads, then log out from the Stats
        (STS) server then destroys the Stats display window if it
        exists.
    sts_UpdateTime(int)
        Method: sts_UpdateTime(int seconds) Descr: If the Display
        Window is active, takes the input time value (in seconds)
        and updates the time display.
    toggleStatVectors( )
        Method: toggleStatVectors( ) Descr: Toggles the data
        collection vectors from set 1 to set 2
            Inputs: None
            Outputs: None
    updateStatsDisplay( )
        Sets flag updateNow to let DisplayStats know when to
        update.
Field Definitions
    fetchTime
        public int fetchTime
    FETCH_NONE
        public final static int FETCH_NONE
    FETCH_APPS
        public final static int FETCH_APPS
    RECV_APPS
        public final static int RECV_APPS
    FETCH_TIME
        public final static int FETCH_TIME
    RECV_TIME
        public final static int RECV_TIME
    FETCH_CONNECTS
        public final static int FETCH_CONNECTS
    RECV_CONNECTS
        public final static int RECV_CONNECTS
    FETCH_CONTACTS
        public final static int FETCH_CONTACTS
    RECV_CONTACTS
        public final static int RECV_CONTACTS
    FETCH_TCODES
        public final static int FETCH_TCODES
    RECV_TCODES
        public final static int RECV_TCODES
    FETCH_NAME
        public final static int FETCH_NAME
    RECV_NAME
        public final static int RECV_NAME
    FETCH_DONE
        public final static int FETCH_DONE
    fetchState
        public int fetchState
    db
        public boolean db
    bDemo
        public boolean bDemo
    updateNow
        public boolean updateNow
    statsAvail
        public boolean statsAvail
    bStatsServerAvail
        public boolean bStatsServerAvail
    props
        public TrsProps props
    p
        public Properties p
Constructor Definitions
    StatsCollector
        public StatsCollector( )
Method Definitions
    init
        public void init( )
        Overrides:
            init in class Applet
    start
        public void start( )
            Method: start( )
            Descr: Creates but does not display the DisplayStats
            popup window. If Successful connection to the STS
            Server, starts the STSRecv thread for receiving
            TrsMsgs from the server and spawns the FetchStats
            thread to request data from the server. Finally,
            tries to connect to the Unison database to retrieve
            and store (locally) Term Code definition data.
            Inputs: None
            Outputs: None
            Overrides:
                start in class Applet
    stop
        public void stop( )
            Overrides:
                stop in class Applet
    destroy
        public void destroy( )
            Destroy method. Closes db connection, TO DO: need to
            close/flush the receive to avoid broken pipe
            Overrides:
                destroy in class Applet
    fetchStats
        public void fetchStats( )
            Get Agent Stats from server.
    process
```

```
public void process(TrsMsgMsg msg)
    Takes a TrsMsgMsg received from the STS server and
    calls the correct processing routine based on the
    fetchState flag. No action for a null message
    receipt or if the message is a non-expected one.
    Parameters:
        TrsMsgMsg - reference
sendAgentName
    public boolean sendAgentName( )
        Sends a query to the STS server to obtain all Agent
        names so that a match may be found for the input
        agent name. When the match is found, the agentID
        will be set from the received data.
        agent_state agent_login=[agent name]
sendAgentAppsAndCamps
    public boolean sendAgentAppsAndCamps( )
        Sends a query to the STS server to obtain all
        Campaigns and Applications for the agent at this
        workstation. Sets fetchStats to receive this info
        back after sending the message. Uses the server
        query:
        agent_time agent_id=[valid agent id #] camp_id=-1
sendAgentTime
    public boolean sendAgentTime( )
        Method: sendAgentTime( ) Descr: Sends a query to the
        STS server to obtain the active times for all the
        agents associated with this agent's Campaigns. Logs
        the times to all three Stats tables depending on the
        agent, application or campaign. Sets fetchStats to
        receive this info back after sending the message.
        Uses the server query (for each campaign):
        agent_time agent_id=-1 camp_id=[valid campaign id #]
        state=ALL
            Inputs: None
            Outputs: None
sendAgentContacts
    public boolean sendAgentContacts( )
        Method: sendAgentContacts( ) Descr: Sends a query to
        the STS server to obtain the number of contacts for
        all the agents associated with this agent's
        Campaigns. Logs the times to all three Stats tables
        depending on the agent, application or campaign.
        Sets fetchStats to receive this info back after
        sending the message. Uses the server query (for
        each campaign): agent_inputs agent id=-1
        camp_id=[valid campaign id #] mode=FINAL contact=-1
            Inputs: None
            Outputs: None
sendAgentTermCodes
    public boolean sendAgentTermCodes( )
        Method: sendAgentTermCodes( ) Descr: Sends a query to
        the STS server to obtain all Term Codes and Term
        Code numbers for the agent for their applications
        and campaigns. Also collects comparative data for
        all the agents associated with this agent's
        Campaigns. Sets fetchStats to receive this info
        back after sending the message. Uses the server
        query (for each campaign): agent_inputs agent_id=-1
        camp_id=[valid campaign id #] input=ALL
            Inputs: None
            Outputs: None
restartStatistics
    public void restartStatistics( )
        Method: restartStatistics( ) Descr: Called when an
        unexpected logout from the STS Server occurs. Runs
        the STSConnect thread which will continuously try to
        reconnect to the Stats Server.
            Inputs: None
            Outputs: None
resetStatVectors
    public void resetStatVectors( )
        Method: resetStatVectors( ) Descr: Resets presently
        active Stats Vectors to empty, if they are not
        already empty.
            Inputs: None
            Outputs: None
resetAllVectors
    public void resetAllVectors( )
        Method: resetAllVectors( ) Descr: Resets all Stats
        Vectors to empty, if they are not already empty.
            Inputs: None
            Outputs: None
toggleStatVectors
    public synchronized void toggleStatVectors( )
        Method: toggleStatVectors( ) Descr: Toggles the data
        collection vectors from set 1 to set 2
            Inputs: None
            Outputs: None
updateStatsDisplay
    public void updateStatsDisplay( )
        Sets flag updateNow to let DisplayStats know when to
        update.
connectToStatsServer
    public boolean connectToStatsServer( )
        Method: connectToStatsServer( ) Descr: Attempts to
        hook up to the Stats (STS) Server. If successful,
        starts the STSRecv thread for receiving server
        messages and returns true, otherwise returns false.
            Inputs: None
            Outputs: true if STS Server connection made
            false otherwise
sts_StartStatistics
    public void sts_StartStatistics( )
        Method: sts_StartStatistics( ) Descr: Get Term Code
        information and then it will then try to connect to
        the Stats Server (STS). If successful, it then
        starts the STSRecv thread for receiving TrsMsgs from
        the server and spawns the thread to retrieve data
        from the server.
            Inputs: None
            Outputs: None
sts_StopStatistics
    public void sts_StopStatistics( )
        Method: sts_StopStatistics( ) Descr: Called before
        the Statistics object is destroyed, calls the
        Statistics applet's stop( ) method which will stop
        the TrsMsg receive and data collection threads, then
        log out from the Stats (STS) server then destroys
        the Stats display window if it exists.
            Inputs: None
            Outputs: None
sts_ShowStatistics
    public void sts_ShowStatistics(boolean bShow)
        Method: sts_ShowStatistics(boolean b) Descr: If the
        Stats window is not null, will show or hide the
        window depending on the value of the input
        parameter.
            Inputs: b = false: Hide Window b = true: Show
            Window
            Outputs: None
sts_IsServerAvailable
    public boolean sts_IsServerAvailable( )
        Method: sts_IsServerAvailable( ) Descr: Returns true
        to the caller if the Stats server is available and
        logged in to (real stats are being collected) or
        false if the server is not available (real stats
        cannot be collected).
            Inputs: None
            Outputs: returns true if STS server available;
            false if STS server not available
sts_SetAgentID
    public void sts_SetAgentID(int id)
        Method: sts_SetAgentID(int id) Descr: Takes as input
        an int that is the presently logged on Agent ID.
            Inputs: int containing Agent ID
            Outputs: None
sts_GetAgentID
    public int sts_GetAgentID( )
        Method: sts GetAgentID( ) Descr: Returns the present
        setting of the Stats internal Agent ID.
            Inputs: None
            Outputs: int containing Agent ID
sts_SetAgentName
    public void sts_SetAgentName(String s)
        Method: sts_SetAgentName(Strings) Descr: Takes as
        input a String that is the presently logged on Agent
        name.
            Inputs: String Object containing Agent Name
```

-continued

```
            Outputs: None
    sts_GetAgentName
        public String sts_GetAgentName( )
            Method: sts_GetAgentName( ) Descr: Returns to the
            caller the String that is the presently defined
            Agent name. This is presently set by the STS server
            and will be null otherwise. Thus if no STS server
            connection has been made, the name will be null.
                Inputs: None
                Outputs: returns Agent name string if STS
                server available null otherwise
    sts_SetFrequency
        public void sts_SetFrequency(int frq)
            Method: sts_SetFrequency(int frq) Descr: Takes as
            input an integer value that will be the data
            collection frequency (in minutes).
                Inputs: int value for frequency (in minutes)
                Outputs: None
    sts_GetNumApplications
        public int sts_GetNumApplications( )
            Get number of available applications. Returns[:]
            the number of applications presently available for
            the stats display window, 0 if none are available
    sts_GetNumCampaigns
        public int sts_GetNumCampaigns( )
            Get number of available campaigns.
            Returns: the number of campaigns presently available
            for the status display window, 0 if none are
            available
    sts_UpdateTime
        public void sts_UpdateTime(int seconds)
            Method: sts_UpdateTime(int seconds) Descr: If the
            Display Window is active, takes the input time value
            (in seconds) and updates the time display. This is
            used to show time between data fetches.
                Inputs: None
                Outputs: Number of campaigns.
    sts_GetApplication
        public AgentStatElements sts_GetApplication(int index)
            Method: sts_GetApplication(int index) Descr: Returns
            an AgentStatElements object reference for the input
            indexed element in the Application Stats Vector.
            Will return null for an invalid index or if no data
            is available in the Application Stats Vector.
                Inputs: index of the vector element to return
                Outputs: AgentStatElements object reference
    sts_GetCampaign
        public AgentStatElements sts_GetCampaign(int index)
            Method: sts_GetCampaign(int index) Descr: Returns an
            AgentStatElements object reference for the input
            indexed element in the Campaign Stats Vector. Will
            return null for an invalid index or if no data is
            available in the Campaign Stats Vector.
                Inputs: index of the vector element to return
                Outputs: AgentStatElements object reference
    sts_GetCompCampaign
        public AgentStatElements sts_GetCompCampaign(int index)
            Method: sts_GetCompCampaign(int index) Descr:
            Returns an AgentStatElements object reference for
            the input indexed element in the Comparative Stats
            Vector. Will return null for an invalid index or if
            no data is available in the Comparative Stats
            Vector.
                Inputs: index of the vector element to return
                Outputs: AgentStatElements object reference
    sts_GetTermCodeDef
        public TermCodeElements sts_GetTermCodeDef(int app_id,
                                                  String code)
            Method: sts_GetTermCodeDef(int app_id, String code)
            Descr: Returns a TermCodeElements object reference
            when the input app_id AND code are matched in the
            tcDefinitions vector. Will return null for no
            match.
                Inputs: int app id = application id for Term
                Code String code = the Term Code's code value
                Outputs: TermCodeElements reference or null if
                no match
{Note: Delete Footer.}
{Note: Delete Header.}
```

-continued

```
Class davox.trsmsg.TrsXdr
[java.long.Object
    |
    +----davox.trsmsg.TrsXdr
public class TrsXdr
extends Object
Class for converting]
```

The public class TrsXdr converts messages to and from XDR format. When sending a message, this class is used to take a TrsMsgMsg and write it in XDR format to the output buffer in TrsMsgBuf. When receiving a message, this class is used to build a TrsMsgMsg from the data stored in the input buffer in TrsMsgBuf. Notice that all communications with Unison involve either two writes or two reads as we move data between: TrsMsgMsg <---> TrsMsgBuf <---> Connection to server. Note, this is not a true or complete XDR facility. It is a workaround to allow an XDRish stream to be used for communication with servers. The following are field, constructor and method indices and definitions for the public class, "Trsxdr".

```
Field Index
    TRSDT_BYTE
    TRSDT_CHAR
    TRSDT_FLOAT
    TRSDT_INT
    TRSDT_STRING
Constructor Index
    TrsXdr( )
Method Index
    xdrBufRead(TrsMsgMsg)
        Construct a message from the data stored in the input
        buffer.
    xdrBufWrite(TrsMsgMsg)
        Write a message to the output buffer in XDR format.
Field Definitions
    TRSDT_BYTE
        public final static int TRSDT_BYTE
    TRSDT_INT
        public final static int TRSDT_INT
    TRSDT_CHAR
        public final static int TRSDT_CHAR
    TRSDT_FLOAT
        public final static int TRSDT_FLOAT
    TRSDT_STRING
        public final static int TRSDT_STRING
Constructor Definitions
    TrsXdr
        public TrsXdr( )
Method Definitions
    xdrBufWrite
        protected static boolean xdrBufWrite(TrsMsgMsg msg)
            Write a message to the output buffer in XDR format.
            Parameters:
                msg - The message to be written.
    xdrBufRead
        protected static void xdrBufRead(TrsMsgMsg msg) throws
            OException
                Construct a message from the data stored in
                the input buffer.
            Parameters:
                msg - The message to be built.
{Note: Delete Footer.}
{Note: Delete Header.}
    Class davox.util.Console
[java.long.Object
    |
    +----java.awt.Component
         |
         +----java.awt.Container
              |
```

```
            +----java.awt.Window
                    |
                    +----java.applet.Frame
                            |
                            +----davox.util.Console
public class Console
extends Frame
Utility]
```

The public class Console is a utility class for logging messages from applets. An instance of Console should be used and not "System.out.println". Applet Params: LOGCAT Categories of information to log include: log informational messages error; log error messages debug; log debug messages time; include a timestamp on each message number; include a message number on each message type; prefix each message with it's type (I,E,D); LOGMODE; which method(s) to use for logging information buffered; and buffer messages internally. Sent to our own console window when "dumpMessages( )" is called. It is standard protocol to log all messages to the Java console as they occur. LOGBUFF number sets the size of the buffer to be used for logging messages. When the buffer is full, the oldest messages will be lost to allow storage of new messages. The default number of messages that can be stored in the buffer is 1000. The following are field, constructor and method indices and definitions for the public class, "Console".

```
Constructor Index
    Console(Applet)
        Constructor.
Method Index
    appendDebug (Object)
        Appends to an existing debug message.
    debug (Object)
        Logs debug messages.
    dumpMessages ( )
        Dumps buffered messages to the Java console.
    error(Object)
        Logs error messages.
    exception (Exception)
        Logs error messages.
    handleEvent (Event)
        Handles input events on our "pseudo Java console" window.
    info (Object)
        Logs information messages.
Constructor Definitions
    Console
        public Console(Applet applet)
            Constructor.
            Parameters:
                applet - Handle to applet.
                Used to get applet parameters.
Method Definitions
    info
        public void info(Object o)
            Logs information messages.
            Parameters:
                o - Object whose toString( ) method is to be
                called for text of message.
    error
        public void error(Object o)
            Logs error messages.
            Parameters:
                o - Object whose toString( ) method is to be
                called for text of message.
    debug
        public void debug(Object o)
            Logs debug messages. This is for
            development/debugging use only.
            Parameters:
                o - Object whose toString( ) method is to be
                called for text of message.
    exception
        public void exception(Exception e)
            Logs error messages.
            Parameters:
                o - Object whose toString( ) method is to be
                called for text of message.
    appendDebug
        public void appendDebug(Object o)
            Appends to an existing debug message. This is used
            to better format debug messages.
            Parameters:
                o - Object whose toString( ) method is to be
                called for text of message.
    dumpMessages
        public void dumpMessages( )
            Dumps buffered messages to the Java console
    handleEvent
        public boolean handleEvent(Event e)
            Handle input events on our "pseudo Java console"
            window.
            Overrides:
                handleEvent in class Component
Class davox.util.CsvDb
```

The public class "CsvDb" reads ".csv" files and allows them to be navigated as simple databases. Thus, this class supports the simulation of call records in the demo mode of the browser user interface. As such, this class does not contain a full set of database methods. Rather, only those needed for the demo mode are included. CSV stands for "Comma Separated Values". A csv file is an ASCII text file that can be produced by spreadsheets, such as Excel. The only format restriction that is imposed on csv files is that the first row must contain all the field names. Subsequent rows provide the data for each field. Each row is considered one record. Here is a simple, sample csv file containing 2 records, "CUSTNAME,ADDRESS,CITY,STATE John Doe,1 Any St.,YourTown,MA. Mary Jane,2 Main St., Westford,MA". The user specifies the CSV file to be loaded on the constructor. Once constructed records can be traversed with nextRecord( ) and gotoRecord( ). GetField( ) can be used to retrieve the value of a field on the current record. SetField( ) is used to set the value of a field on the current record.

```
Constructor Index
    CsvDb(URL)
        Constructs a CsvDb from a CSV file.
Method Index
    getField(int)
        Returns the value of the field identified in the current
        record.
    getField(String)
        Returns the value of the field identified in the current
        record.
    getFieldCount( )
        Retrieve the number of fields in the current record.
    getFieldNames( )
        Returns the field names (the first record) in the CSV
        file.
    getRecordCount( )
        Retrieve the number of data records.
    gotoRecord(int)
        Position to a specific record index.
    nextRecord( )
        Position to next record.
    setField(String, String)
        Set the value of a field in the current record
```

-continued

```
Constructor Definitions
    CsvDb
        public CsvDb(URL url) throws IOException
            Constructs a CsvDb from a CSV file.
            Parameters:
                url - URL of CSV file to be loaded.
Method Definitions
    nextRecord
        public void nextRecord( )
            Position to next record. If at last record, will
            wrap to first record. This is the behavior
            that is required to simulate call data.
    getFieldNames
        public String[ ] getFieldNames( )
            Returns the field names (the first record) in the
            CSV file.
    gotoRecord
        public void gotoRecord(int n)
            Position to a specific record index.
            Parameters:
                n - Record index.
    getRecordCount
        public int getRecordCount( )
            Retrieve the number of data records.
    getFieldCount
        public int getFieldCount( )
            Retrieve the number of fields in the current record.
            Note for a well formatted CSV file this should be
            the same for all records.
    getField
        public String getField(int n)
            Returns the value of the field identified in the
            current record. If the field does not exist null is
            returned.
            Parameters:
                n - Index of the field who's value is to be
                retrieved.
    getField
        public String getField(String field)
            Returns the value of the field identified in the
            current record. If the field does not exist null is
            returned.
            Parameters:
                field - Name of the field who's value is to be
                retrieved.
    setField
        public void setField(String field, String value)
            Set the value of a field in the current record.
```

Accordingly, the present invention features a proxy server 30 which utilizes a JDBC Java code based communication link 32 to each client workstation 12 to access external databases such as database 34 on application server 22, or a separate host or database 36 remote and external from the web server 28 and server computer 18. In accordance with the present invention, each client workstation 12 includes a browser 38 such as Netscape or Microsoft Explorer. These tasks are considered "lightweight" in terms of processing requirements on the personal computer on which the client workstation 12 is implemented. As such, a high level of performance of the client workstation is essentially guaranteed. Alternatively, instead of a proxy server, a system in accordance with the present invention may include a network file sharer, such as a disk drive, in place of the proxy server, connected between the web server 18 and the application server 22.

In a typical "web page" based information display, each "page" may include one or more applets 40 which are typically HTML/Java code based and can be utilized to present "active" objects on the display 14 of each client workstation. Such active objects include buttons which can be pushed, audio, display animation, and other well known active objects.

In accordance with the exemplary embodiment of the present invention, application server 22 is a separate computer such as a personal computer or workstation (such as the type manufactured by Sun Microsystems) which generally includes application software code 42, generally proprietary code written in one or more standard or non-standard programming languages. An application code 42 directs the operation of the system including, in an exemplary embodiment, control of a telephone line switch 44 either internal to the application server 22 or more preferably external to application server 22 in the form of an automated call distributor (ACD) as is well known in the art.

In the exemplary embodiment, the voice line switch 44 controls the switching of the line on one of the incoming telephone lines 46 to one of the voice data sets 24 at each of the client workstations 12. The application server 22 coordinates the switching of voice of a particular telephone call with data associated with that telephone call which may be retrieved by one or more data bases 34, 36 or other data base or host system.

In the present exemplary embodiment, application server 22 also includes an interface to a supervisor workstation 50 which may be another personal computer running one or more applications 52. In the preferred embodiment, supervisor workstation 50 includes one or more "wizards" which is a software programming tool which allows inexperienced users to quickly, easily, and with minimum knowledge of a program language, write various software programs or routines to accomplish various functions.

For example, the present invention features a script wizard which allows a supervisor (for example a telephony agent supervisor) located at supervisor workstation 50 to create scripts and script pages containing scripts for use by the agents. As is well known in the telephony industry, scripts are phrases including both text and active objects which are displayed on the agent's client workstation display 14 to allow the user sitting at the client workstation 12 to perform an operation critical (also sometimes referred to as mission critical) application, such as a telephony application, from the client workstation.

{NOTE: Originally pages 90–98 of the Specification.}

An exemplary script "wizard" is the ScreenLogic Script Builder available from Davox Corporation, the assignee of the present invention. The ScreenLogic Script Builder is a tool that is used to create scripts and script pages to be displayed on an Agent Web Station (AWS) or workstation 12. This tool is an MDI style window that runs under Windows95 on a PC desktop. The development environment that is used to build ScreenLogic is PowerBuilder. ScreenLogic is integrate directly into the Unison PC Supervisor workstation 50 and also takes advantage of the Davox Foundation Class translation functionality wherever possible.

According to one feature of the present invention, ease of use is paramount. The script builder/wizard of the present is easy to learn and use by Management/Supervisory Personnel. It is intuitive, logical, fast and made so that errors/problems are identified on the fly. This includes building screens and defining logical branching structures. We will incorporate "self-help" functionality and "wizards" to assist the user in every aspect of the script builder operations. We expect purchasers to learn the product through on-line tutorials, documentation and other self-help programs that will use templates and examples to assist. [ One though is that if Davox Education Department is needed to teach the user, the product is not easy enough to use.

The script builder/wizard allows the user to create a script page which can include text, pictures, sound, JAVA applets, data base fields, and links to other pages. The JAVA applets that can be inserted need not be limited to Davox or other proprietary created applets but include 3rd party applets as well. The database fields that can be inserted will include Unison® database fields, external database(s) fields assessable through ODBC as well as user defined fields. Further examples of the exemplary script builder/wizard 54 according to the present invention can be found in the Davox LYRICall™ User's Guide available from Davox® Corporation of Westford Mass., previously pages 123–251 of the present application and fully incorporated herein by reference.

Figure 3:
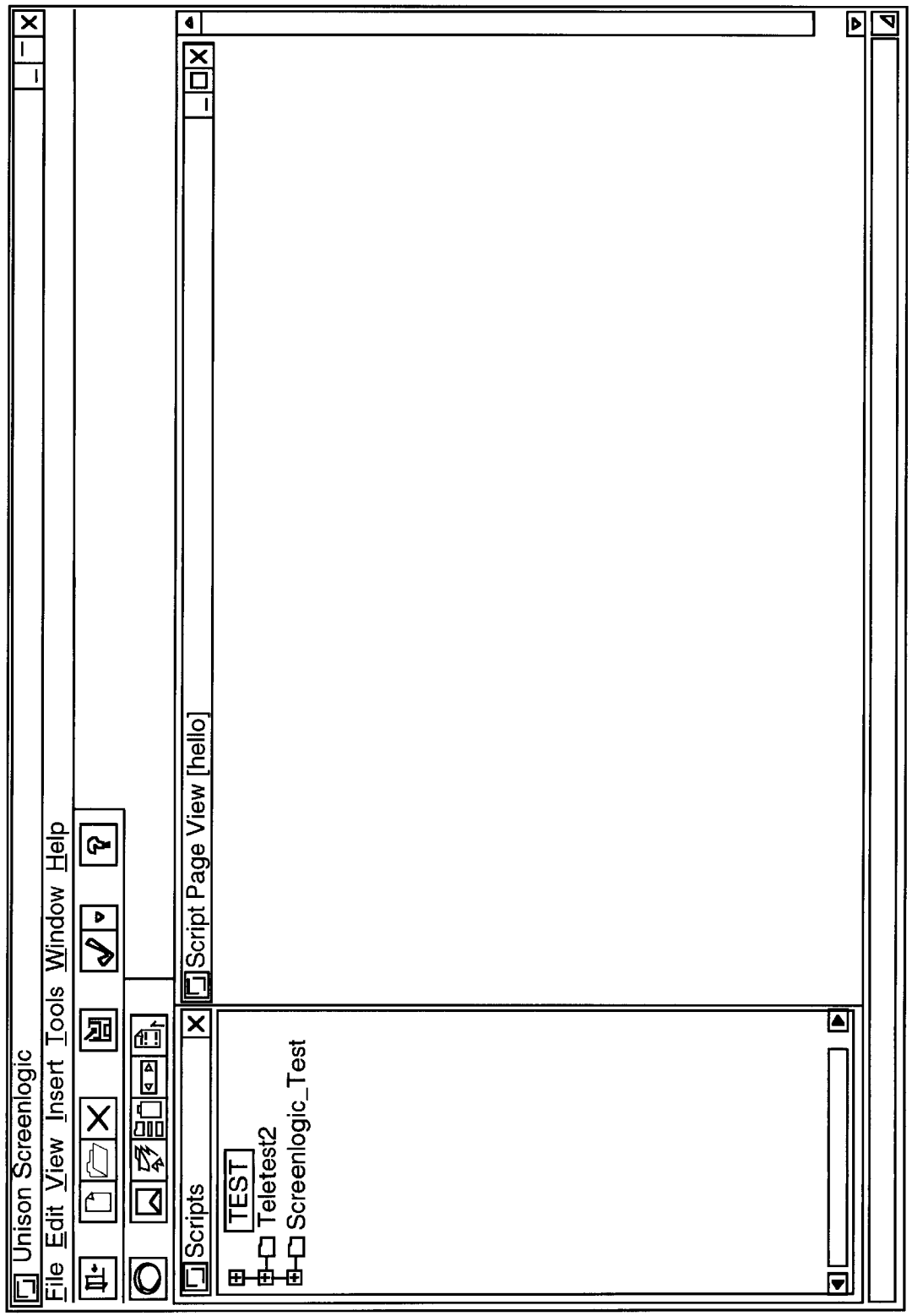
FIG. 3 is a reproduction of a computer splash screen illustrating a main frame window of the web station of the present invention.

The User Interface to the script builder/wizard 54 consists of an MDI Frame Window 100, FIG. 3, that acts as a container for all the windows within the application. When the frame is minimized, the whole user environment will close.

{Note: Illustration is now FIG. 2.}

There are two types of sheet windows that can open in the frame. The first is the script sheet 102 that contains a tree view list of scripts and script pages. The user will be able to double-click on any script page in the list in order to open that page for modification. The second sheet is a page view sheet 104 which is where the editing of objects take place. Multiple page view sheets can be opened at one time, but only one script sheet may be open at a time. The user can cut and paste objects between page view sheets. Also, the user may cut and move objects within one page.

The interface also includes two tool bars that are can be dragged and docked at any point within the frame. The top tool bar 106 contains script/page level functions such as EXIT, NEW, OPEN, CLOSE, SAVE and HELP.

Also, on the toolbar is a cascading menu item that contains the tools available to the user. This menu list will contain a spell checker, screen flow view, calendar tool, agent statistics tools and page deployment interface.

The second tool bar 108 will contain all the objects which can be chosen and dropped onto a script page. These objects include, but are not limited to, the following:

Picture
JAVA Applet
Unison DB Field
User Defined DB Field
ODBC DB Field
Paragraph
Forms
Radio Button
Datasets
User Defined HTML
Check Box
Drop Down List Box
Sound Associated with all of these objects is a pop menu which will appear when the user right clicks on the object. This menu is customized for each object and depending on the object, present to the user a choice of the following options:

Scripts/Pages

A script is a construct that is used to describe a group of multiple script pages. A script file contains a description of the user data defined in the builder, a list of pages that are part of the script, and comment fields and other descriptive elements that describe thingsinformation about the script such as name, description, creation date and modification date.

A script has a directory associated with it. This directory typically resides under the forms directory in the directory hierarchy. Each script has it's own directory. The start page for the script, however, will reside in the forms directory and will branch to script pages in the script directory.

The script page is the heart of the script. Each script can have an unlimited number of pages that contain the objects inserted by the script builder/wizard 54. These script pages contain related information and data and can have links to other pages. The pages are created individually by the script builder/wizard 54 and are linked together based on the objects created on the page. A page can contain any of the objects described in the components section herein.

Script pages can be part of only one script. If a script page is reusable in another script, it must be copied to the directory for that script and inserted into the script.

Components

The following explains some of the object components that are presently utilized, although other component types are within the scope of the present invention. These components include:

1. Picture

A picture object is an image that can be added to a script page. A picture image must be of type .gif or .jpg in order to display correctly on a Netscape browser. Internet Explorer from Microsoft will also support an image of type .bmp.

2. JAVA Applet

A JAVA applet object can be added to a script page. This applet can be a Davox® created applet such as a navbar or credit card verifier, or the applet can be from a third party. In the case of a Davox created applet, a specific wizard will be associated with the applet. If the applet is from a third party, then a generic wizard will be used. If a generic wizard is used, then it is up to the user to understand how it works and what parameters are needed and how they are to be configured. Each Davox applet will have it's own button on the tool bar while the generic applet button will cover third party applets.

3. Unison® DB Field

The user has the capability to drop a Unison DB field either on the page or within other objects on the page. The other objects include a paragraph object or a marquee object. The user can add the field into another object by right clicking on that object. A pop menu will appear with a choice of inserting the field.

If an object is to be dropped onto the page, it must be part of a form. The list of possibilities for fields comes from the Unison or other database and is defined as part of the application. These fields would normally be part of a PDD file.

4. User Defined DB Field

The user has the capability to drop a User Defined DB field either on the page or within other objects on the page. The other objects include the paragraph object or the marquee object. The user can add the field into another object by right clicking on that object. A pop menu will appear with a choice of inserting the field.

If an object is to be dropped onto the page it must be part of a form. The list of possible fields is user defined. When the user chooses to add a user defined field, they can pick from a list of currently defined user fields. This list resides in the script file. If the user wants to add a new field, they can do so at this time. Once a new field is added, it will be available for use from that point on.

5. ODBC DB Field

The user will have the capability to drop an ODBC or JDBC DB field either on the page or within other objects on the page. The other objects include the paragraph object or the marquee object. The user can add the field into another object by right clicking on that object. A pop menu will appear with a choice of inserting the field.

If an object is to be dropped onto the page it must be part of a form. The list of possible fields is generated by a tool that will create the list from querying of the selected database.

6. Paragraph

A paragraph object allows the user to enter in text. This text can be a free flowing style since the browser in which it is to be displayed will handle the formatting of the paragraph. The user can insert all db field types into a paragraph. Additionally, fonts and size of characters in the paragraph can be changed.

7. Forms
8. Radio Button
9. Datasets
10. User Defined HTML

A user defined HTML object allows the user to enter in straight HTML formatted or type text into the script. This allows flexibility in creation of the html file. If there is some portion of the html language that is not supported, the user can use this object to do whatever they want. The html that is part of this object will, in one embodiment, be pasted straight into the file without any error checking, so the user must make sure that their code is correct.

11. Check Box
12. Drop Down List Box
13. Sound

Wizards & Templates

Figure 4:
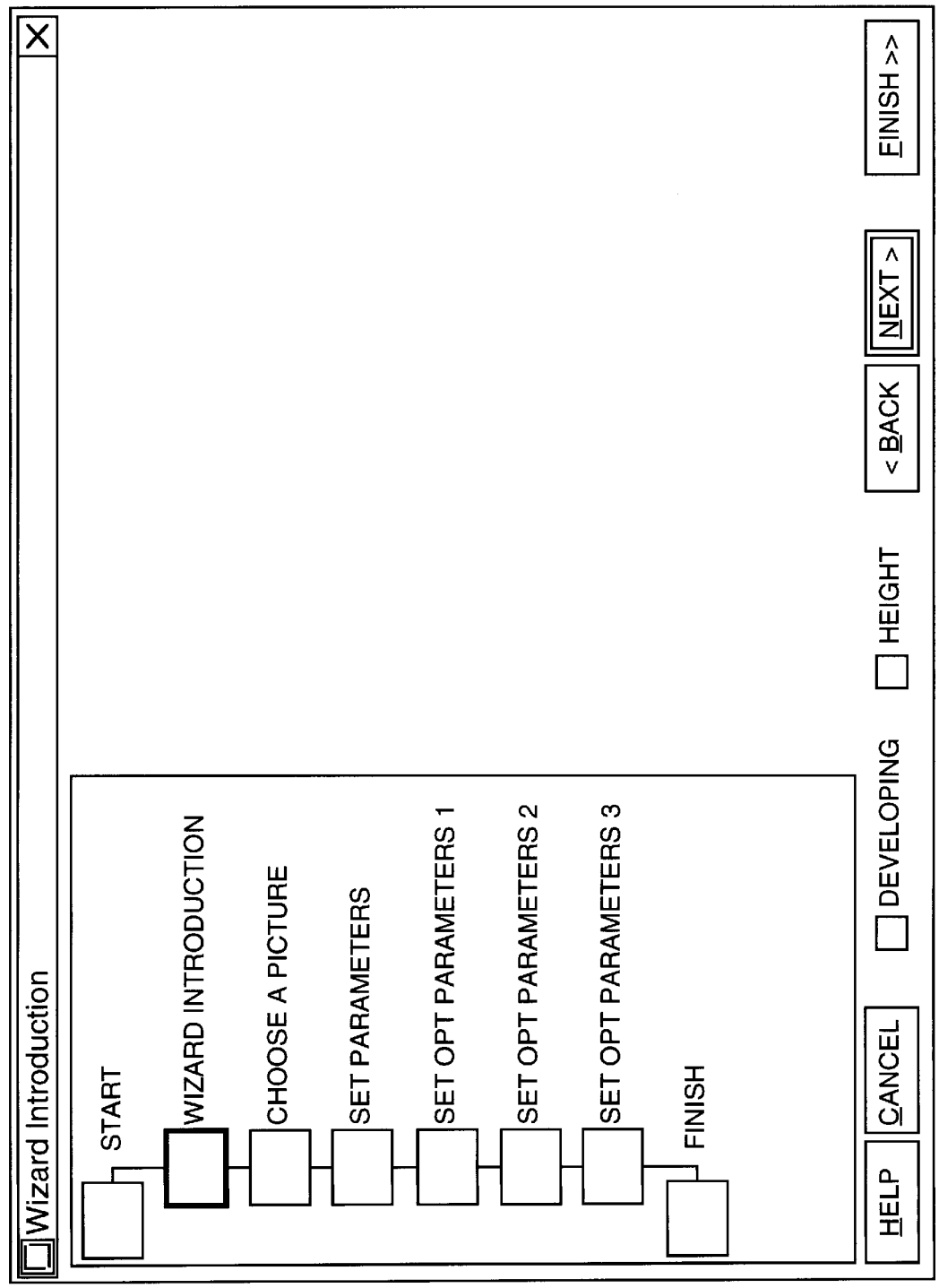
FIG. 4 is a reproduction of a computer splash screen illustrating the main screen of an exemplary script wizard according to one feature of the present invention.

One of the key components of the script builder/wizard 54 of the present invention is ease of use. With that in mind, the wizard concept within the present invention allows that each object that can be inserted into a script will have a setup wizard associated with it. The setup wizard FIG. 4, will step the page builder through all necessary steps in setting up the particular object, the result of which will be a picture object with a reference to a chosen picture inserted into the page within a script page. These wizards will facilitate helping the user to understand what is needed to set up an object. As the user becomes more familiar with using some or all of the objects, they can selectively disable individual wizards. This will be done through the options choice on the frame menu.

Along with the wizards associated with the objects will be wizards which will step the user through the initial steps of setting up a script as well as a script page. This wizard will step the user through setting fonts, default character size, background and foreground colors, etc.

Along with ease of use is the concept of templates. When a user creates a new script, the user can choose a template instead of using the wizard to set up the page or script. The present invention contemplates the inclusion of some canned template files but also gives the user the ability to create their own templates. These template will have any common aspects of a script or script page included in them.

For example, if all the pages in a script use the same template when created, common background and foreground colors can be set ahead of time as well as font size and any objects which are to appear on all pages. This will save the user from having to do the common things on every page.

Figure 5:
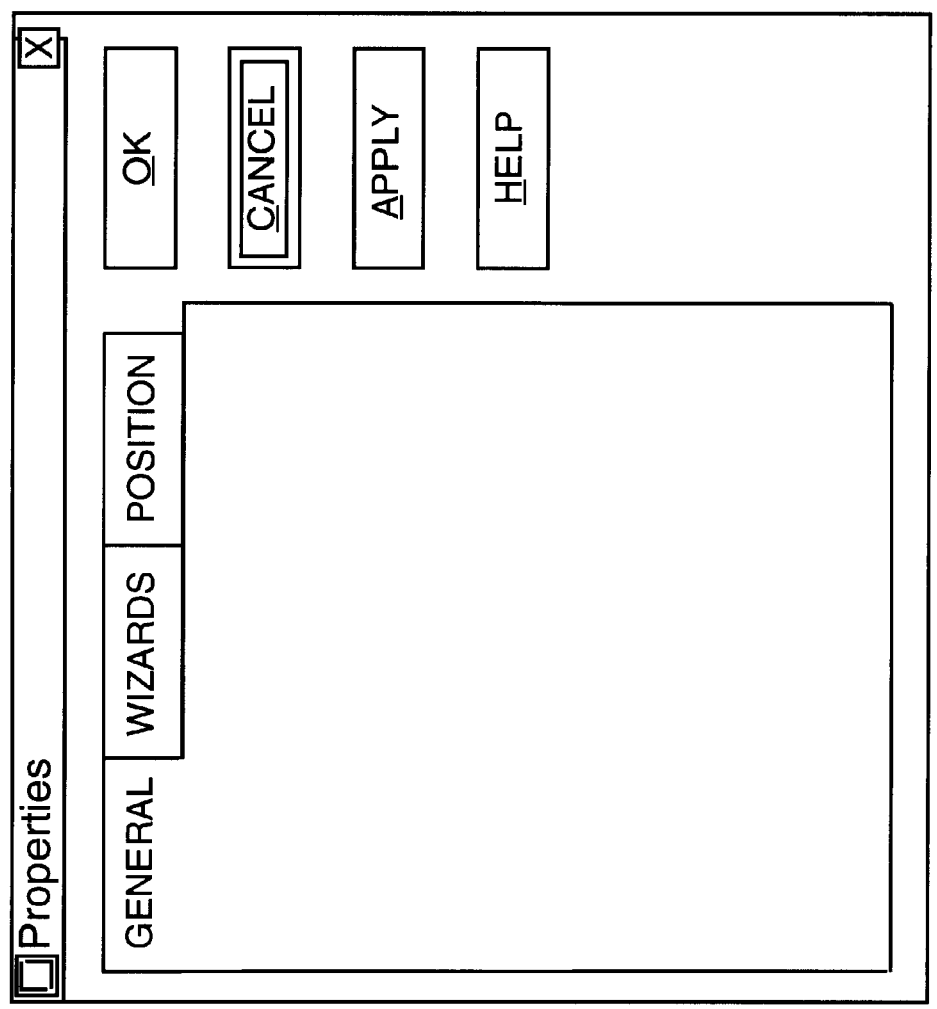
FIG. 5 is a reproduction of a computer splash screen illustrating an object property sheet for objects placed into a script according to another feature of the present invention.

Each object that can be inserted into a script page has a corresponding property sheet, FIG. 5. This property sheet is different for each object and describes the pertinent information associated with the object. For example, in the case of a picture object, the name of the picture will be available as well as the position of the object on the page. A user can modify this property sheet and apply the changes to change the characteristics of the object on the fly. Since each sheet is different, the number of tabs and information on the tabs may change on a per sheet basis.

Tools

1. Spell Checker

A spell checking mechanism is provided as a way that the user can check their script page for spelling errors. A third party OCX will be employed to do this. Any object which has text in it can be spell checked.

2. Screen Flow View

This tool gives the user a high level look of pages within a script and the links between them. The user can use this tool to understand the relationships between pages in a script as well as check to see if there are any standalone pages with no link in or out of the page.

3. Calendar Tool

Setting appointments are an important function within many customers' operations. The present invention supports an appointment calendar function that is built by supervisory personnel and displayed graphically for the agents. Each of the agents must be able to access the calendar and lock in an appointment, making it unavailable for others. The feature must update near real time in order to display only currently available appointments and be able to inform a requesting agent that their selection may no longer be available and bringing up other options. Most appointments are made on-line with the prospect on the phone. The supervisor needs to be able to see the same appointment screen as their agents and be able to print it out on demand. The present invention supports multiple calendars for appointments as it is likely there may be a unique schedule per telephone campaign or per call list.

4. Agent Statistics Tools

Near real time agent display statistics are supported by the present invention. Supervisors will have a menu of choices to select from including agent performance display information. This includes: Number of calls handled/contacts, various selected result codes, number of sales, revenue attributable to that agent in the local currency and percent of goal. Supervisors can input a goal per agent or per team or for the call center in either Sales volume numbers or total value in $, £, ¥, f etc 5. Page Deployment Interface When the user is done creating or modifying their script, they must deploy it. This interface allows them to move the selected pages to the server it will reside on. This will be done through FTP but will be graphical in nature so no knowledge of FTP is required.

6. HTML View

The User able to go to the menu and choose to view the HTML that will be generated by this product. This window will be view only since control of what is in this file is important.

Functionality Levels

The functionality available to individual supervisors and/ or users will differ based on a functionality level attribute given to that supervisor/user. It is thought that based on the expertise of the supervisor/user, more and more tools and choices will be given. The present invention can be tailored to different levels of supervisors/users and keep operation as simple as possible.

Level 1

A level 1 user will be given all the capabilities of the ScreenLogic builder.

Level 2

A level 2 supervisor/user will be given a scaled down level of functionality. This is done in order to limit the sensory overload that could be associated with a product such as this. It is thought that a level 2 person will only get the base functionality needed to create a script and script pages without overloading them with choice and functionality.

Functions such as the HTML view, user defined HTML object, the ability to disable certain wizards, and others will be disabled in the builder. A user will only be allowed to access these functions when their user level gets raised within the {Unison]system.

An additional wizard 54 provided by the present invention includes a host connection or connectivity wizard which allows the supervisor to easily, quickly and generally effortlessly determine and program first connections for a particular web browser based "page" displayed on the client workstation display 14 to be accessed through proxy server 30 of the server computer 18.

In the present exemplary embodiment of the present invention, all scripts, script pages, close connections, and the like are stored on the application server 22 and accessed and distributed by the server computer 18 to the client workstations 12.

Utilizing web browser based "internet" features, allows the present invention to present a platform portable, easy to install system and presents to the user of each client workstation 12, a familiar interface to a particular mission critical (considered to be functions critical to the businesses revenue) application. Up until now, using a web browser was limited to casual search, reference and support functions due to the fact that the browser was easy to use and install. However, previous web browser applications were typically not very responsive. Utilizing the present invention, however, and the techniques of the present invention, make the browser display responsive and able to manage the activity and state information required for operation or mission critical business use.

In the prior art, (particularly "mission critical" or essential applications), had their own "look and feel" which were programmed using a graphically user interface and propriety software. This required much learning by the user in order to become familiar with all of the features of the application. The present invention overcomes these limitations by using an internet type browser, such as Netscape or Microsoft Explorer which is now familiar to nearly everyone, and which, in the present invention, is utilized to display web page browser formatted information to the user in a style that he or she is accustomed to seeing. In addition, the users are generally familiar with and in fact need only become familiar with one "set" of tools and toolbars for the browser in order to be able to effectively and efficiently utilize the mission critical application implemented on the system of the present invention. Accordingly, a feature of the present invention is the ability of the present system to provide a web browser based operation critical client workstation.

Because typical mission critical or operation critical applications typically utilize identical or nearly identical "pages" of web browser based information, the present invention includes a web page cache 56 in each of the client workstations 12. Each web page received from the web server 28 is stored or "cashed" in the cache 56 for later re-use by the browser 38. In this manner, the client workstation 12 does not have to request the page from the web server 28, thus greatly improving system performance.

In connection with page cache 56, another feature of the present invention is the provision of a data store 58 in each of the client workstations. A data store 58 is utilized to store information to be added to or merged with web page information stored in page cache 56. In the present invention, this information is received utilizing a message "socket" 60 in the form of a TRS message from the application server. The following example is useful to explain the data store 58. For example, if one particular mission critical application being run by the client workstation 12 is to handle incoming telephone calls from customers, the application server 22 may be utilized to obtain initial customer identification information from the customer using, for example, DTMF touch tone signals from the customers telephone. Thus, the application server 22 can send a message over message socket 60 to a selected one client workstation 12. That message may include a command to handle an incoming telephone call as well as identification information about the calling customer such as a customer number. This information can be stored in data store 58 and when the client workstation is ready, this information can be merged with a selected web page stored in cache 56 to display, on the client workstation display device 14, specific information about the calling customer.

Utilizing another feature of the present invention often termed as "push" technology, the data store 58 can provide data to one or more applets 40 running on one or more web pages and page cache 56 to utilize the JDBC connection 32 to proxy server 30 to retrieve more information about the calling party from one or more external data bases 34 or 36. In this manner, although the calling party/customer may have input only his or her customer number, the browser user interface of the present invention can display, on the client workstation display 14, all of the information about the calling party/customer including name, address, telephone number, account balance and history, etc. Alternatively, the application server 22 may utilize information about the calling party's telephone number to lookup information about the calling party without having to request information from the customer. Utilizing such ANI information from an incoming telephone call is well known to those skilled in the art and considered to be within the scope of the present invention. Additionally, application server 22 also coordinates the generally simultaneous arrival of data from one or more external data sources 34, 36 on a display device 14 of a client workstation 12 along with the arrival of voice information over voice data set 24 at the same client workstation 12. Thus, the present invention allows for mission or operation critical applications to be run from at least one client workstation 12.

An example of an application server includes the "Unison Call Center Management System" manufactured by Davox Corporation, the assignee of the present invention, and described, for example, in U.S. Pat. Nos. 5,577,112, 5,381,470 and 5,592,543 incorporated herein by reference. In the present description, any reference to Unison is a reference to a Call Center Management System or other application server as is well known in the art. In addition, any reference in the present exemplary description to "Lyricall" is understood to be a reference to a collection of software programs/tools which implement the exemplary embodiment of the present invention on the Davox Unison brand Call Center Management System, although this not a limitation of the present invention. Other implementations and software, hardware or combinations thereof are considered to be within the scope of the present invention.

Modifications and substitutions by one of ordinary skill in the art are considered to be within the scope of the present invention which is not to be limited except by the claims which follow.

What is claimed is:

1. A system including a web browser based operation critical client workstation, comprising:

a server computer including at least a web server, for servicing a plurality of connected web browser based client workstations in a client/server architecture; and at least one client workstation, coupled to said server computer, said at least one client workstation including a web page browser user interface, for receiving web browser based information including at least an operation critical application from said server computer and for displaying said information in a web page browser format, wherein said web page browser user interface is an exclusive interface for said operation critical application at said at least one client workstation, wherein a failure of said operation critical application results in an inability of said at least one client workstation to perform an essential purpose, and wherein said operation critical application is a zero install application on said at least one client workstation.

2. The system of claim 1 wherein said operation critical application includes a telephony application.

3. The system of claim 2 in said telephony application includes in inbound telephone call servicing application.

4. The system of claim 2 wherein said telephony application includes an outbound telephone call servicing application.

5. The system of claim 2 wherein said telephony application includes an inbound and an outbound telephone call servicing application.

6. The system of claim 2 wherein said at least one client workstation includes an agent supervisor workstation.

7. The system of claim 1 wherein said operation critical application information includes application audio information and application display animation information.

8. The system as claimed in claim 1 wherein said web page browser type interface further includes at least one java script which is dynamically downloaded from said server.

9. The system as claimed in claim 1 wherein said at least one client workstation does not include any substantial parts of said operation critical application after said web page browser type interface has been closed.

10. A telephony system including a web browser based operation critical call center agent workstation, said system comprising:

a server computer including at least a web server, for servicing a plurality of connected telephony system web browser based client workstations in a client/server architecture;

at least one telephony system web browser based call center agent workstation coupled to said server computer, said at least telephony system web browser based call center agent workstation responsive to said web server and including a web page browser user interface for receiving web browser based information including an operation critical application and for displaying said web browser based information in a web page browser format, wherein said web page browser user interface is an exclusive interface for said operation critical application at said at least one telephony system web browser based call center agent workstation, wherein a failure of said operation critical application results in an inability of said at least one telephony system web browser based call center agent workstation to perform an essential purpose, wherein said operation critical application is a zero install on said at least one telephony system web browser based call center agent workstation; and said telephony system further including a web page format web page authoring application including a script wizard, for allowing a user to generate at least one non-propriety, industry standard telephone active object to handle a telephony application, and a host communication wizard, for allowing the user to generate at least one host connection active object to handle information exchange between said at least one telephony system web browser based call center agent workstation and an external source of data.

11. A web browser based operation critical client workstation comprising:

at least one client workstation, coupled to a server computer in a client/server architecture, said at least one client workstation including a web page browser user interface for receiving web browser based information including an operation critical application and for displaying said information in a web page browser format, wherein said web page user interface is an exclusive interface for said operation critical application at said at least one web browser based operation critical client workstation, the failure of said operation critical application resulting in an inability of said at least one client workstation to perform said essential purpose; and wherein said operation critical application is a zero install application on said at least one client workstation.

12. The system of claim 11 wherein said operation critical application includes a telephony application.

13. The system of claim 11 wherein said web browser based operation critical client workstation stores persistent data to be used by said workstation in said workstation, for later reuse without accessing said server computer.

14. A web browser based client workstation with persistent data store comprising:

at least one client workstation coupled to a server computer in a client/server architecture, said at least one client workstation including a web page browser user interface for receiving web based information including operation critical application data and persistent data and for displaying said information in a web page browser format, said at least one client workstation including a data store for storing persistent data to be reused by a plurality of web pages displayed on said at least one client workstation and to perform said operation critical application from web page browser user interface without re-accessing said server computer, wherein a failure of said operation critical application results in an inability of said client workstation to perform said essential purpose.

15. The system of claim 14 wherein said persistent data is stored in data sets in said persistent data store.

16. A telephony system including a web browser based operation critical agent workstation, said system comprising:

a server computer including at least a web server, for servicing a plurality of connected web browser based agent workstations in a client/server relationship;

at least one telephony system web browser based agent workstation coupled to said server computer, said at least telephony system web browser based agent workstation responsive to said web server and including a web page browser user interface for receiving web browser based information including an operation critical application from said server computer and for displaying said information in a web page browser format, wherein said web page browser user interface is an exclusive interface for said operation critical application at said at least one telephony system web browser based agent workstation; and wherein said operation critical application is a zero install application on said at least one telephony system web browser based agent workstation, and wherein said web browser based information received by said at least agent workstation includes web browser based scripting information, for providing at least one script page to be displayed on said web browser based agent workstation, for providing information to be communicated to a telephony system customer, and said script page for allowing an agent at said web browser agent workstation to input information regarding said telephony system customer in at least one location in said at least one script page displayed on said web browser call center agent workstation.

17. The system of claim 16 further including a plurality of said script pages, at least two of which can be arranged in a logical branch structure, wherein at least a first one of said plurality of script pages includes a predetermined message text comprising at least one question having at least two possible responses, and wherein said agent workstation causes a branch to at least a second script page based on an agent's indication of a response to said at least one question in said predetermined message text of said first script page.

18. The system of claim 17 wherein said logical branch to at least one script page arranged in a logical branch structure is conditioned upon at least one of persistent data received from an application server, data received from a host or at least one answer to said at least one question.

19. A telephony system including a web browser based operation critical agent workstation, said system comprising:
 a server computer including at least a web server, for servicing a plurality of connected web browser based agent workstations in a client/server architecture;
 at least one telephony system web browser based agent workstation coupled to said web server of said server computer, said at least telephony system web browser based agent workstation including a web page browser user interface for receiving web browser based information including a telephony operation critical application from said server computer and for displaying said web browser based information in a web page browser format, wherein said web page browser user interface is an exclusive interface for said telephony operation critical application at said at least one telephony system web browser based agent workstation, wherein a failure of said telephony operation critical application results in an inability of said at least one telephony system web browser based agent workstation to perform an essential purpose;
 said at least one telephony system web browser based agent workstation including a script wizard, for allowing a user to generate at least one non-propriety, industry standard telephony active object, and a host communication wizard, for allowing the user to generate at least one host connection active object to handle information exchange between said at least one telephony system web browser based agent workstation and a host computer; and wherein said telephony operation critical application information includes display of web browser based information for allowing said at least one web browser based agent workstation to control both voice and data relative to at least one telephony call and wherein said telephony operation critical application is a zero install application on said at least one telephony system web browser based agent workstation.

20. The system of claim 19 wherein said web browser based client workstation can access data from multiple sources generally simultaneously, said data to be generally simultaneously displayed on one web page of said web browser based client workstation.

21. A web browser based operation critical client workstation comprising:
 at least one client workstation, coupled to a server computer in a client/server architecture, said at least one client workstation including a web page browser user interface for receiving web based information including an operation critical application and for displaying said information in a web page browser format, wherein web page browser user interface an exclusive interface for said operation critical application wherein a failure of said operation critical application results in an inability of said web browser based operation critical client workstation to perform an essential purpose;
 said server computer also including at least one proxy server, coupled to a source of information external to said server computer, for facilitating access to said data external to said server computer by rerouting tcp/ip protocol communication received from Java applets on said at least one client workstation to at least one application server including said external data; and
 wherein said at least one client workstation includes at least one web browser based web page for communicating with said proxy server of said server computer, for requesting information of said proxy server which is external to said server computer, and for receiving said external information from said data source external from said server computer through said proxy server, and wherein said operation critical application is a zero install application on said at least one client workstation.

22. A system including a web browser based operation critical client workstation with persistent data store, said system comprising:
 at least one client workstation coupled to a server computer in a client/server architecture, said server computer including at least one web server, said at least one client workstation including a web page browser user interface for receiving web browser based information including an operation critical application from said web server and for displaying said information in a web page browser format, wherein said web page browser user interface is an exclusive interface for said operation critical application at said at least one client workstation, wherein a failure of said operation critical application results in an inability of said at least one client workstation to perform said essential purpose; and
 said at least one client workstation including a persistent data store, for receiving and storing data to be utilized by at least one web page displayed by said at least one client workstation, wherein said operation critical application is a zero install application on said client workstation.

23. The system of claim 22 wherein said at least one client workstation includes a web page cache, for storing at least one web page of information previously received from said server computer.

24. The system of claim 23 wherein said web page cache is responsive to said persistent data store, for retrieving data to be utilized by said web page.

25. A system including a web browser based operation critical client workstation, comprising:

at least one client workstation coupled to a server computer in a client/server architecture, said server computer including at least one web server, said at least one client workstation including a web page browser user interface for receiving web browser based information including an operation critical application from said web server and for displaying said web browser based information in a web page browser format, wherein web page browser user interface is an exclusive interface for said operation critical application at said at least one client workstation, wherein a failure of said operation critical application results in an inability of said at least one client workstation to perform said essential purpose; and said web browser based information displayed in a web page browser format on said at least one client workstation including at least one client workstation side active object, said active object for initiating and controlling an operation without intervention of said server computer, wherein said operation critical application is a zero install application on said at least one client workstation.

* * * * *